(12) United States Patent (10) Patent No.: US 9,277,837 B2
Yoakim et al. (45) Date of Patent: Mar. 8, 2016

(54) METHOD FOR PREPARING A BEVERAGE OR LIQUID FOOD AND SYSTEM USING BREWING CENTRIFUGAL FORCE

(75) Inventors: Alfred Yoakim, St. Legier -la Chiesaz (CH); Jean-Paul Denisart, La Conversion (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 141 days.

(21) Appl. No.: 12/602,542

(22) PCT Filed: Apr. 11, 2008

(86) PCT No.: PCT/EP2008/054401
§ 371 (c)(1),
(2), (4) Date: Dec. 1, 2009

(87) PCT Pub. No.: WO2008/148601
PCT Pub. Date: Dec. 11, 2008

(65) Prior Publication Data
US 2010/0173056 A1    Jul. 8, 2010

(30) Foreign Application Priority Data

| Jun. 5, 2007 | (EP) | 07109579 |
| Jun. 5, 2007 | (EP) | 07109580 |
| Feb. 29, 2008 | (EP) | 08102147 |
| Feb. 29, 2008 | (EP) | 08102148 |
| Feb. 29, 2008 | (EP) | 08102149 |

(51) Int. Cl.
*A47J 31/22* (2006.01)
*A47J 31/36* (2006.01)
(Continued)

(52) U.S. Cl.
CPC ............... *A47J 31/407* (2013.01); *A47J 31/22* (2013.01); *B65D 85/8043* (2013.01)

(58) Field of Classification Search
USPC ............................. 426/433, 435, 431; 99/287
See application file for complete search history.

(56) References Cited

U.S. PATENT DOCUMENTS

| 239,659 A | 4/1881 | Houston |
| 1,963,426 A | 6/1934 | Taylor ............................. 97/233 |
| 1,963,476 A | 6/1934 | Smith |

(Continued)

FOREIGN PATENT DOCUMENTS

| AT | 197553 B | 5/1958 |
| BE | 894 031 | 2/1983 |

(Continued)

OTHER PUBLICATIONS

U.S. Appl. No. 12/856,369, filed Aug. 13, 2010.
(Continued)

*Primary Examiner* — Nikki H Dees
*Assistant Examiner* — Stephanie Cox
(74) *Attorney, Agent, or Firm* — Winston & Strawn LLP

(57) ABSTRACT

A method for preparing a beverage or liquid from a food substance contained in a filtering receptacle by passing water through the substance using brewing centrifugal forces. The method includes feeding water into the receptacle, and driving the receptacle in centrifugal rotation to force water to flow through the substance in a centrifugal flow path to the outlet of the receptacle. The receptacle is a sealed capsule which is opened for water to be introduced into the capsule, contains a predetermined dose of food substance and is discarded after use.

15 Claims, 14 Drawing Sheets

(51) Int. Cl.
*B65D 85/804* (2006.01)
*A47J 31/40* (2006.01)

(56) References Cited

U.S. PATENT DOCUMENTS

| | | | |
|---|---|---|---|
| 2,778,739 A | 1/1957 | Rodth | 99/171 |
| 2,899,886 A | 8/1959 | Rodth | |
| 2,952,202 A | 9/1960 | Renner et al. | |
| 3,025,781 A | 3/1962 | Bossi | |
| 3,233,535 A | 2/1966 | Fowlie | |
| 3,269,298 A | 8/1966 | Grundmann | |
| 3,566,770 A | 3/1971 | Crossley | 99/289 |
| 3,654,852 A | 4/1972 | Rosan, Sr. | |
| 3,812,773 A | 5/1974 | Hultsch | 99/290 |
| 3,822,013 A | 7/1974 | Van Der Veken | |
| 3,967,546 A | 7/1976 | Cailliot | 99/286 |
| 3,985,069 A | 10/1976 | Cavalluzzi | 99/295 |
| 4,136,202 A | 1/1979 | Favre | |
| 4,426,919 A | 1/1984 | Rhoten | 99/289 |
| 4,464,982 A | 8/1984 | Leuschner et al. | 99/287 |
| 4,473,002 A | 9/1984 | Leuschner et al. | 99/302 |
| 4,545,296 A | 10/1985 | Ben-Shmuel | 99/289 P |
| 4,584,101 A | 4/1986 | Kataoka | |
| 4,806,375 A | 2/1989 | Favre | 426/433 |
| 4,846,052 A | 7/1989 | Favre et al. | |
| 4,859,337 A | 8/1989 | Woltermann | 210/474 |
| 4,962,693 A * | 10/1990 | Miwa et al. | 99/283 |
| 5,047,252 A | 9/1991 | Liu et al. | 426/79 |
| 5,265,517 A * | 11/1993 | Gilbert | 99/280 |
| 5,300,308 A | 4/1994 | Louridas | |
| 5,325,765 A * | 7/1994 | Sylvan et al. | 99/295 |
| 5,343,799 A | 9/1994 | Fond | |
| 5,566,605 A | 10/1996 | Lebrun et al. | 99/302 |
| 5,637,335 A | 6/1997 | Fond et al. | 426/84 |
| 5,649,472 A | 7/1997 | Fond et al. | 99/295 |
| 5,656,311 A | 8/1997 | Fond | |
| 5,755,149 A | 5/1998 | Blanc et al. | 99/289 |
| 5,773,067 A | 6/1998 | Freychet et al. | |
| 5,826,492 A | 10/1998 | Fond et al. | |
| 5,948,455 A | 9/1999 | Schaeffer et al. | 210/337 |
| 6,007,853 A | 12/1999 | Lesser | 426/77 |
| 6,607,762 B2 | 8/2003 | Lazaris et al. | 426/79 |
| 6,777,007 B2 | 8/2004 | Cai | 426/78 |
| 6,786,134 B2 | 9/2004 | Green | |
| 6,849,285 B2 | 2/2005 | Masek et al. | |
| 6,854,378 B2 | 2/2005 | Jarisch et al. | |
| 7,017,775 B2 | 3/2006 | Zettle et al. | |
| 7,153,530 B2 | 12/2006 | Masek et al. | |
| 7,216,582 B2 | 5/2007 | Yoakim et al. | 99/295 |
| 7,325,478 B2 | 2/2008 | Cautenet et al. | |
| 7,325,479 B2 | 2/2008 | Laigneau et al. | |
| 7,469,627 B2 | 12/2008 | Li | 99/286 |
| 7,569,242 B2 | 8/2009 | Barber et al. | |
| 7,569,243 B2 | 8/2009 | Yoakim et al. | |
| 7,770,512 B2 | 8/2010 | Albrecht | 99/295 |
| 7,981,451 B2 | 7/2011 | Ozanne | |
| 8,151,694 B2 | 4/2012 | Jacobs et al. | |
| 8,307,754 B2 | 11/2012 | Ternite et al. | |
| 8,327,754 B2 | 12/2012 | Kirschner et al. | |
| 8,409,646 B2 | 4/2013 | Yoakim et al. | |
| 8,431,175 B2 | 4/2013 | Yoakim et al. | |
| 8,512,784 B2 | 8/2013 | Denisart et al. | |
| 8,813,634 B2 | 8/2014 | Yoakim et al. | |
| 2003/0116029 A1 | 6/2003 | Kollep | |
| 2003/0145736 A1 | 8/2003 | Green | 99/280 |
| 2003/0159593 A1 | 8/2003 | Leutwyler | |
| 2003/0189872 A1 | 10/2003 | Artman et al. | |
| 2004/0255790 A1 | 12/2004 | Green | |
| 2005/0150390 A1 | 7/2005 | Schifferle | 99/295 |
| 2005/0188854 A1 | 9/2005 | Green et al. | |
| 2006/0003075 A1* | 1/2006 | Meador | 426/590 |
| 2006/0110507 A1 | 5/2006 | Yoakim et al. | 426/433 |
| 2006/0196364 A1 | 9/2006 | Kirschner | |
| 2006/0236871 A1 | 10/2006 | Ternite et al. | |
| 2007/0079708 A1 | 4/2007 | Li | 99/279 |
| 2007/0248734 A1 | 10/2007 | Denisart et al. | |
| 2007/0289453 A1 | 12/2007 | Halliday | |
| 2008/0014860 A1 | 1/2008 | Heitman et al. | |
| 2008/0038414 A1 | 2/2008 | Veciana I. Membrado et al. | |
| 2008/0122286 A1 | 5/2008 | Brock et al. | |
| 2008/0187638 A1 | 8/2008 | Hansen | |
| 2009/0032454 A1 | 2/2009 | Rapparini | |
| 2009/0050540 A1 | 2/2009 | Imai et al. | |
| 2009/0136639 A1 | 5/2009 | Doglioni Majer | 426/431 |
| 2009/0155422 A1 | 6/2009 | Ozanne | 426/89 |
| 2009/0218877 A1 | 9/2009 | Derman | |
| 2010/0024658 A1 | 2/2010 | Jacobs et al. | |
| 2010/0064899 A1 | 3/2010 | Aardenburg | 99/295 |
| 2010/0108541 A1 | 5/2010 | Roberto | |
| 2010/0176004 A1 | 7/2010 | Schneider et al. | 205/687 |
| 2010/0178392 A1 | 7/2010 | Yoakim et al. | 426/80 |
| 2010/0178404 A1 | 7/2010 | Yoakim et al. | 426/431 |
| 2010/0186599 A1 | 7/2010 | Yoakim et al. | 99/295 |
| 2010/0203198 A1 | 8/2010 | Yoakim et al. | 426/80 |
| 2010/0203208 A1 | 8/2010 | Yoakim et al. | 426/431 |
| 2010/0239734 A1 | 9/2010 | Yoakim et al. | 426/433 |
| 2011/0041702 A1 | 2/2011 | Yoakim et al. | 99/302 R |
| 2011/0052761 A1 | 3/2011 | Yoakim et al. | 426/77 |
| 2011/0189362 A1 | 8/2011 | Denisart et al. | |
| 2011/0217421 A1 | 9/2011 | Perentes et al. | 426/80 |
| 2011/0244099 A1 | 10/2011 | Perentes et al. | 426/431 |
| 2011/0262601 A1 | 10/2011 | Manser et al. | |
| 2012/0058226 A1 | 3/2012 | Winkler et al. | |

FOREIGN PATENT DOCUMENTS

| | | |
|---|---|---|
| BE | 894031 A1 | 2/1983 |
| CA | 2625215 A1 | 4/2007 |
| CN | 1656983 A | 8/2005 |
| CN | 101001555 A | 7/2007 |
| DE | 2151920 A1 | 4/1973 |
| DE | 3241606 | 3/1984 |
| DE | 35 29 053 | 2/1987 |
| DE | 35 29 204 | 2/1987 |
| DE | 3529204 | 2/1987 |
| DE | 37 19 962 | 6/1988 |
| DE | 42 40 429 | 6/1994 |
| DE | 44 39 252 | 5/1996 |
| DE | 10355671 A1 | 6/2004 |
| DE | 10 2005 008 852 | 8/2006 |
| EP | 0242556 A1 | 10/1987 |
| EP | 0 250 810 A1 | 1/1988 |
| EP | 0 367 600 | 5/1990 |
| EP | 0 512 470 A1 | 11/1992 |
| EP | 521187 A1 | 1/1993 |
| EP | 0521510 A1 | 1/1993 |
| EP | 0 607 759 | 7/1994 |
| EP | 0 651 963 | 5/1995 |
| EP | 0 749 713 | 12/1996 |
| EP | 0 806 373 B1 | 11/1997 |
| EP | 1208782 B1 | 5/2002 |
| EP | 1 299 022 B1 | 4/2003 |
| EP | 1 654 966 B1 | 5/2006 |
| EP | 1 774 878 | 4/2007 |
| EP | 1 813 333 A2 | 8/2007 |
| EP | 2 000 062 A1 | 12/2008 |
| EP | 2155021 B1 | 3/2011 |
| FR | 2 132 310 | 11/1972 |
| FR | 2 487 661 | 7/1981 |
| FR | 2 513 106 | 3/1983 |
| FR | 2 531 849 | 2/1984 |
| FR | 2 535 597 | 5/1984 |
| FR | 2617389 A1 | 1/1989 |
| FR | 2 624 364 | 6/1989 |
| FR | 2 685 186 | 6/1993 |
| FR | 2 686 007 | 7/1993 |
| FR | 2 726 988 | 5/1996 |
| GB | 1 506 074 A | 4/1978 |
| GB | 2 416 480 | 4/1985 |
| GB | 2 227 405 A | 8/1990 |
| GB | 2 253 336 | 9/1992 |
| GB | 2 416 480 A | 2/2006 |
| JP | 50-016225 A | 2/1975 |
| JP | 62-254719 A | 11/1987 |

(56) References Cited

FOREIGN PATENT DOCUMENTS

| | | |
|---|---|---|
| JP | 63-034581 U | 3/1988 |
| JP | 2-124111 A | 5/1990 |
| JP | 02189114 A2 | 7/1990 |
| JP | 6104091 B | 12/1994 |
| JP | 06339431 A2 | 12/1994 |
| JP | 59-082817 A | 5/1995 |
| JP | 3034606 U | 2/1997 |
| JP | 2001061663 A2 | 3/2001 |
| JP | 2002-189115 A | 7/2002 |
| JP | 2002-215414 A | 8/2002 |
| JP | 2003-144973 A2 | 5/2003 |
| JP | 2004-517654 A | 6/2004 |
| JP | 2005516602 | 6/2005 |
| JP | 2005-199071 A2 | 7/2005 |
| JP | 2005-525146 A | 8/2005 |
| JP | 2006-515764 A | 6/2006 |
| JP | 2006-518226 A | 8/2006 |
| JP | 2008508041 A | 3/2008 |
| JP | 2008520298 A | 6/2008 |
| TW | 200718383 | 5/2007 |
| WO | WO 94/02059 A1 | 2/1994 |
| WO | WO 02/17760 A1 | 3/2002 |
| WO | WO 02/35977 A1 | 5/2002 |
| WO | WO 2004/030500 A1 | 4/2004 |
| WO | WO2005/066040 A2 | 7/2005 |
| WO | WO 2006/082064 A1 | 8/2006 |
| WO | WO 2006/112691 | 10/2006 |
| WO | WO 2007/014584 A1 | 2/2007 |
| WO | WO 2007/041954 | 4/2007 |
| WO | WO2007042414 A1 | 4/2007 |
| WO | WO 2007/085921 A2 | 8/2007 |
| WO | WO 2007/110768 A2 | 10/2007 |
| WO | WO 2008/087099 A2 | 7/2008 |
| WO | WO 2008/148604 | 12/2008 |
| WO | WO 2008/148604 A1 | 12/2008 |
| WO | WO 2008/148646 | 12/2008 |
| WO | WO 2008/148650 | 12/2008 |
| WO | WO 2008/148656 | 12/2008 |
| WO | WO 2008/148834 | 12/2008 |
| WO | WO 2008148601 A1 | 12/2008 |
| WO | WO 2009/050540 A1 | 4/2009 |
| WO | WO 2009/106175 A1 | 9/2009 |
| WO | WO 2009/106598 A1 | 9/2009 |
| WO | WO 2009/133134 A1 | 11/2009 |
| WO | WO 2010/026045 A1 | 3/2010 |
| WO | WO 2010/026053 A1 | 3/2010 |
| WO | WO 2010/038213 A2 | 4/2010 |
| WO | WO 2010/041179 A2 | 4/2010 |

OTHER PUBLICATIONS

U.S. Appl. No. 12/860,705, filed Aug. 20, 2010.
International Search Report mailed Feb. 9, 2010 for Application No. PCT/EP2009/060697 filed Aug. 19, 2009.
International Search Report mailed Feb. 8, 2010 for Application No. PCT/EP2009/060771 filed Aug. 20, 2009.
U.S. Appl. No. 12/602,553, filed Dec. 1, 2009.
U.S. Appl. No. 12/602,562, filed Dec. 1, 2009.
U.S. Appl. No. 12/602,568, filed Dec. 1, 2009.
U.S. Appl. No. 12/602,577, filed Dec. 1, 2009.
U.S. Appl. No. 12/602,730, filed Dec. 2, 2009.
U.S. Appl. No. 12/776,155, filed May 7, 2010.
U.S. Appl. No. 13/061,558, filed Mar. 1, 2011.
U.S. Appl. No. 13/061,567, filed Mar. 1, 2011.
Written Opinion of the International Searching Authority and International Search Report, PCT/EP2008/056968, mailed Oct. 7, 2008.
Written Opinion of the International Searching Authority and International Search Report, PCT/EP2008/056310, mailed Oct. 8, 2008.
Written Opinion of the International Searching Authority and International Search Report, PCT/EP2008/056345, mailed Oct. 1, 2008.
Written Opinion of the International Searching Authority and International Search Report, PCT/EP2008/056412, mailed Sep. 11, 2008.
Written Opinion of the International Searching Authority and International Search Report, PCT/EP2008/054810, mailed Oct. 24, 2008.
European Search Report, EP 09174573.7, mailed Apr. 9, 2010.
Chilean Patent Application No. CL-1652-2008, filed Jun. 5, 2008 (English in U.S. equivalent 2010/0173056 and WO2008/148601).
Chilean Patent Application No. CL-1653-2008, filed Jun. 5, 2008 (English in U.S. equivalent 2010/0186599 and WO2008/148604).
Chilean Patent Application No. CL-1655-2008, filed Jun. 5, 2008 (English in U.S. equivalent 2010/0178404 and WO2008/148646).
Written Opinion of the International Searching Authority and International Search Report, PCT/EP2008/054401, mailed Sep. 11, 2008.
Non Final Office Action, U.S. Appl. No. 12/602,577, dated Mar. 20, 2012.
Non Final Office Action, U.S. Appl. No. 12/602,562, dated Feb. 13, 2012.
Non Final Office Action, U.S. Appl. No. 12/602,730, dated May 17, 2012.
Non Final Office Action, U.S. Appl. No. 12/860,705, dated Mar. 16, 2012.
Restriction Requirement, U.S. Appl. No. 12/602,553 dated May 11, 2012.
Non Final Office Action, U.S. Appl. No. 12/602,568, dated Mar. 20, 2012.
Green Mountain Coffee, New K-Cup Samplers Offer More Variety; Jul. 11, 2008, pp. 1-5. Accessed Mar. 6, 2012 from http://www.greenmountincafe.com/2008/07/new-k-cup-samplers-offer-more-variety/.
Non Final Office Action, U.S. Appl. No. 12/776,155, dated Jul. 18, 2012.
Final Office Action, U.S. Appl. No. 12/602,568, dated Jul. 16, 2012.
Final Office Action, U.S. Appl. No. 12/602,562, dated Jun. 22, 2012.
Final Office Action, U.S. Appl. No. 12/602,577, dated Jul. 20, 2012.
Final Office Action, U.S. Appl. No. 12/860,705, dated Jul. 18, 2012.
Restriction Requirement U.S. Appl. No. 13/133,613 dated Mar. 28, 2013.
Restriction Requirement U.S. Appl. No. 12/856,369 dated Feb. 15, 2013.
Notice of Allowance U.S. Appl. No. 12/776,155 dated Mar. 1, 2013.
Notice of Allowance U.S. Appl. No. 12/602,568 dated Feb. 1, 2013.
Advisory Action, U.S. Appl. No. 12/602,577 dated Oct. 11, 2012.
NonFinal Office Action, U.S. Appl. No. 12/602,568, dated Oct. 19, 2012.
Final Office Action, U.S. Appl. No. 12/602,730, dated Sep. 18, 2012.
Non-Final Office Action, U.S. Appl. No. 13/061,567 dated May 10, 2013.
NonFinal Office Action, U.S. Appl. No. 12/602,553, dated Aug. 23, 2012.
Advisory Action, U.S. Appl. No. 12/602,730 dated Jan. 18, 2013.
Final Office Action U.S. Appl. No. 13/061,558 dated May 21, 2013.
Notice of Allowance, U.S. Appl. No. 13/061,567 dated Jun. 11, 2013.
Final Office Action U.S. Appl. No. 12/602,553 dated Apr. 11, 2013.
Non Final Office Action, U.S. Appl. No. 13/133,613, dated Jul. 18, 2013.
Non Final Office Action, U.S. Appl. No. 12/856,369, dated Jul. 30, 2013.
Non-Final Office Action, U.S. Appl. No. 12/602,577 dated Nov. 1, 2013.
Non-Final Office Action, U.S. Appl. No. 12/602,730 dated Dec. 17, 2013.
Final Office Action, U.S. Appl. No. 12/602,542 dated Oct. 4, 2012.
U.S. Appl. No. 12/602,577, Final Office Action, dated May 16, 2014.
U.S. Appl. No. 13/061,558 Non-Final Office Action, dated Feb. 14, 2014.
U.S. Appl. No. 12/602,562, Non-Final Office Action, dated Jul. 17, 2014.
U.S. Appl. No. 13/133,613, Final Office Action, dated Mar. 21, 2014.
U.S. Appl. No. 12/602,553, Final Office Action, dated May 8, 2014.
Notice of Allowance, U.S. Appl. No. 12/602,577, mailed Nov. 14, 2014.
Notice of Allowance, U.S. Appl. No. 13/061,558, dated Sep. 26, 2014.
Advisory Action, U.S. Appl. No. 12/602,553, Jul. 23, 2013.
Restriction Requirement, U.S. Appl. No. 12/602,562, Dec. 23, 2011.
Advisory Action, U.S. Appl. No. 12/602,562, Sep. 25, 2012.
Advisory Action, U.S. Appl. No. 12/602,568, Sep. 27, 2012.

(56) References Cited

OTHER PUBLICATIONS

Notice of Allowance, U.S. Appl. No. 12/602,730, Apr. 29, 2014.
Restriction Requirement, U.S. Appl. No. 12/776,155, Apr. 30, 2012.
Final Office Action, U.S. Appl. No. 12/856,369, Mar. 10, 2014.
Advisory Action, U.S. Appl. No. 12/856,369, May 9, 2014.
Restriction Requirement, U.S. Appl. No. 12/860,705, Dec. 30, 2011.
Advisory Action, U.S. Appl. No. 12/860,705, Oct. 17, 2012.
Notice of Allowance, U.S. Appl. No. 12/860,705, Nov. 14, 2013.
Restriction Requirement, U.S. Appl. No. 13/061,558, Nov. 13, 2012.
Non-Final Office Action, U.S. Appl. No. 13/061,558, Dec. 6, 2012.
Non-Final Office Action, U.S. Appl. No. 12/602,553, Jan. 13, 2015.
Final Office Action, U.S. Appl. No. 12/602,562, Feb. 11, 2015.

\* cited by examiner

METHOD FOR PREPARING A BEVERAGE OR LIQUID FOOD AND SYSTEM USING BREWING CENTRIFUGAL FORCE

This application is a 371 filing of International Patent Application PCT/EP2008/054401 filed Apr. 11, 2008.

BACKGROUND

The present invention relates to a method for preparing a beverage or liquid food from a food substance which is brewed or extracted by using centrifuge forces exerted on a receptacle which contains the substance. The invention also relates to a system for carrying out the method.

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material is present.

Existing systems consist of placing the coffee powder in a receptacle which is usually a non-removable part of a machine such as in EP 0367 600B1. Such devices have many disadvantages. Firstly, the coffee powder must be properly dosed manually in the receptacle. Secondly, the spinned coffee waste becomes dry and it must be removed by scraping the surface of the receptacle. As a result, the coffee preparation requires a lot of manual handling and is so very time consuming. Usually coffee freshness can also vary a lot and this can impact on the cup quality because coffee comes generally from bulk package or coffee is ground from beans in the receptacle itself.

Also, depending on the manual dosage of coffee and the brewing conditions (e.g., centrifugal speed, receptacle size) the cup quality can vary a lot.

Therefore, these systems have never reached an important commercial success.

In DE 102005007852, the machine comprises a removable holder into which an open cup-shaped part of the receptacle is placed; the other part or lid being attached to a driving axis of the machine. The advantage is to be able to conveniently remove and clean the receptacle. However, a disadvantage is the intensive manual handling. Another disadvantage is the difficulty to control quality of the coffee due to a lack of control for the dosing of the powder and a lack of control of the freshness of the coffee powder.

Other devices for brewing coffee by centrifuge forces are described in WO 2006/112691; FR2624364; EP0367600; GB225336; FR2686007; EP0749713; DE4240429; EP0651963; FR2726988; DE4439252; EP0367600; FR2132310; FR2513106; FR2487661; DE3529053.

The effect of centrifugal forces to brew coffee or other food substances presents many advantages compared to normal "espresso" type brewing methods using high pressure pumps. In "espresso" types brewing methods, it is very difficult to master all the parameters which influence the quality of extraction of coffee. These parameters are typically the pressure, the flow rate which decreases with the pressure, the compaction of the coffee powder which also influences the flow characteristics and which depends on the coffee ground particle size, the temperature, the water flow distribution and so on.

Therefore, there is a need for proposing a new extraction process and a capsule adapted therefore for which the extraction parameters can be better and more independently controlled and therefore can be better mastered for controlling quality of the final brewed liquid.

There is also a need for providing a system capable of brewing different kinds of beverages, in particular, coffee beverages, for example, espresso, filter coffee or café latte, while adjusting the brewing characteristics of each beverage so that the optimum beverage can be obtained. In particular, there is a need for a versatile system which provides an easy, simple way of controlling the brewing parameters, in particular, the brewing pressure range on the bed of substance.

At the same time, there is a need for a method which is more convenient compared to the prior art centrifugal devices and which provides a better in-cup quality with a higher control of important quality parameters such as freshness and dosage in the receptacle.

SUMMARY OF THE INVENTION

The invention relates, in the more general sense, to a method for preparing a beverage or liquid from a food substance contained in a filtering receptacle by passing water through the substance using brewing centrifugal forces comprising:

feeding water in the receptacle, driving the receptacle in centrifugal rotation to force water to flow through the substance in a centrifugal flow path to outlet means of the receptacle, wherein the receptacle is formed by a sealed capsule before its use which is opened for water to be introduced in the capsule; said capsule containing a predetermined dose of food substance and being discarded after use.

The capsule can be sealed in a gastight manner to preserve freshness of the substance contained in its enclosure. The capsule can be opened in the device itself, e.g., by piercing of the capsule, or alternatively before the capsule is inserted in the device, e.g., by piercing of the capsule or removing a sealing foil of the capsule.

The capsule can be opened for water to be introduced in the capsule, after insertion of the capsule in the beverage preparation device, by piercing of the capsule.

The capsule can also be opened for water to be introduced in the capsule, before insertion of the capsule in the beverage preparation device by providing at least one passage, by piercing or removing a sealing foil of the capsule.

The method more particularly relates to the preparation of a liquid food or beverage, in a beverage preparation device, from a food substance contained in a filtering receptacle by passing water through the substance using brewing centrifugal forces comprising:

feeding water in the receptacle, driving the receptacle in centrifugal rotation to force water to flow through the substance in a centrifugal flow path to outlet means of the receptacle, wherein the receptacle is formed by a capsule which is sealed before use;

wherein the capsule contains a dose of food substance;

wherein the capsule is placed in the beverage preparation device, wherein the capsule is opened for water to be introduced in the capsule;

wherein the capsule is removed from the beverage preparation device for being discarded after the liquid has been brewed from the capsule by centrifugation of the capsule in the beverage preparation device.

The term "sealed" capsule means that the capsule is made of materials having gas barrier properties and is sealed in a fluid tight manner so that ingress of air in the capsule is prevented. Furthermore, the capsule preferably contains an inert gas that improves the freshness of substance in the capsule. The capsule can also be wrapped with an outer protective membrane which is removed before the capsule is placed in the device.

Preferably, the capsule contains a dose of substance for preparing one or two servings (e.g., cups) of beverage. Cups of beverage are usually sized between about 25 to 220 mL.

The dose of substance for a single cup of coffee may be, for instance, between 4 to 8 grams of roast and ground coffee.

It must be noted that surprising improved brewing results are obtained by this method which can lead to amounts of coffee solids in the cup which are higher than pressure using methods (e.g. "espresso" type methods using brewing water pressurized by a pump). Without being bound by theory, it is supposed that water flow is more uniformly distributed by centrifuge effect and it creates less or no preferential flow paths in the coffee bed as compared to traditional methods using a positive pressure obtained by a pressure pump.

The food substance in the capsule can be ground coffee powder, soluble coffee, tea, chocolate, whitener, flavours and combinations thereof The capsule is preferably driven in rotation at a centrifugal speed of at least 5000 rpm, more preferably between 5000 and 16000 rpm. Surprisingly, at such high rotational speeds, improved coffee crema is obtained with a capsule containing ground coffee. Crema has a more creamy consistency like a real emulsion of oil and water compared to usual crema obtained by traditional methods which is more watery with larger bubble size.

Of course, the speed also depends on the nature of the food ingredient. For leaf tea, the centrifugal speed is preferably low to provide infusion rather than a pressure extraction. In particular, for leaf tea, the centrifugal speed is comprised between 10 and 1000 rpm, more preferably between 50 and 500 rpm.

The capsule can comprise a sealing lid. The sealing lid can comprise a flexible membrane. The membrane can comprise gas barrier and support layers made of polymers, aluminium and/or aluminium alloys.

The capsule can also comprise a cup-shaped body onto which the sealing lid is sealed. The cup-shaped body also comprises gas barrier materials. It can be in metal such as thin aluminium and/or plastic.

In another embodiment, the capsule is made of two sealed flexible foils. The foils can be symmetrically arranged forming two identical sides and welded at a peripheral seam.

In another mode, the capsule comprises a plastic lid attached to a cup-shaped body. The plastic lid and body can be attached through a clipping member comprising a deflectable sealing lip. The deflectable lip is designed so that it opens under the effect of the centrifugal forces transferred to the brewed liquid exiting the capsule. In a variant of this mode, the capsule comprises a plastic lid welded on a cup-shaped body whereas a series of premade peripheral outlets are provided in the lid and/or body for the brewed liquid to leave the capsule under the effect of the centrifugal forces. The premade peripheral outlets may be a series of small slits of small size to also filter the brewed liquid and maintain solid particles of the substance in the capsule. The lid and body can thus be welded by ultrasounds or any suitable connection method.

The method of the invention comprises an operation wherein hot water is introduced into the capsule at substantially no pressure. Water can be brought by a hot water feed mechanism using a principle of aspiration or vaporisation.

Alternatively, for a higher flow consistency, hot water can be introduced using a low pressure pump such as a peristaltic pump or a diaphragm pump and the like.

The method also encompasses an operation during which at least one peripheral liquid outlet is made before or when water is introduced in the sealed capsule.

The outlets can be pierced on a lid of the capsule. Outlets can also be pierced on a sidewall of the capsule.

In one mode, a plurality of outlets is formed by piercing at a peripheral area of the capsule. This method has the advantage to require a simpler capsule. The number of outlets can be chosen to control the flow rate of the brewed liquid. Since the outlets are radially oriented in series, a high pressure layer or jets of the brewed liquid is formed that is expelled out of the capsule.

Preferably, in the method of the invention, the brewed liquid is also collected to form a homogeneous flow of the liquid food or beverage which can be directed to the cup.

In a mode, at least one peripheral outlet is formed in the capsule by an opening occurring under the effect of the pressure of liquid carried out by the centrifugal forces.

The invention also concerns a system for preparing a beverage or liquid food from a food substance contained in a filtering receptacle by passing water through the substance using centrifugal forces comprising:
  a device comprising:
   water feed means for introducing water in the receptacle,
   driving means for driving the receptacle in centrifugal rotation,
    wherein the receptacle is formed by a capsule which contains the food substance and is insertable in the device for brewing of the liquid food and then removable from the device after brewing of the liquid food,
  wherein the system further comprises referencing means for positioning and referencing the capsule in a removable manner in the device and in operational relationship with the water feed means and along an axis of rotation along the driving means.

Preferably, the capsule is a gastight sealed receptacle before being inserted in the device.

In one aspect of the system of the invention, the capsule comprises trunconical sidewalls which promote the drainage of the brewed liquid across the substance to the outlet(s) of the capsule.

In another possible aspect, the capsule has a rigid lid resiliably attached to a cup-shaped body. The lid can be plastic. The lid and body can be attached via a radial deflectable sealing means which opens by effect of the centrifugal effect to let the brewed liquid pass. For example, the deflectable sealing means can comprise at least one peripheral plastic lip of the lid engaging in a seat of the cup-shaped body or vice versa.

The invention also relates to a device for preparing a beverage or liquid food from a food substance contained in a capsule by passing water through the substance in the capsule comprising:
  water feed means for introducing water in the capsule,
  wherein it further comprises referencing means for positioning and referencing the capsule along an axis of rotation in the device and driving means for driving the capsule in centrifugal rotation.

The referencing means are designed for receiving the capsule in a removable manner. They are designed for receiving the capsule in the device in operational relationship with the water feed means and the driving means. The referencing means comprise a capsule holder comprising a cavity which is drivable in rotation. The capsule holder can be driven in rotation at a speed of more than 7500 rpm. The capsule holder is, for instance, connected to a motor via a drive shaft arranged for driving the capsule holder about a central rotational axis. The referencing means comprise a water injection lid closing on the injection surface of the capsule. The lid and capsule can co-act in closure about the capsule while leaving a collecting chamber. The driving means comprise a motor and a shaft associated in rotational arrangement with the capsule holder and/or lid. The capsule holder and lid can swivel along bearings. The collecting chamber preferably comprises surfaces that surround the capsule radially. The collecting chamber can be associated to a duct for directing the flow of brewed liquid to a recipient (e.g., a cup).

The device may optionally comprise a by-pass conduit arranged to add a part of water in the collector without this part of water passing in the capsule. The additional part of water enables to prepare beverages of larger volumes with a part of brewed liquid and a part of water. For large coffee, for instance Americano-type, since the total volume of the coffee beverage is not passed through the capsule, an over-extraction of the ground coffee can be avoided and bitterness can be reduced. This results in a large coffee beverage having an improved taste.

According to another aspect of the invention, the device comprises a control unit adapted to vary the speed of the driving means for driving the capsule in centrifugal rotation therefore providing different centrifugal pressures in the capsule. As a result, the brewing pressure conditions in the capsule can be easily tailored to the type of beverages to be brewed. More preferably, the control unit is programmed to provide at least two different centrifugal speeds. In an example, a first rotational speed is comprised within a value range of 500 to 15000 rpm and a second rotational speed is comprised within a value range of 5000 and 20000 rpm. For example, low speed values can be set by the control unit to brew coffee with less or no foam such as American coffee. The higher speed values can be set by the control unit to brew coffee with a higher amount of foam such as espresso or lungo coffee. The foam (e.g., coffee crema) is obtained by shearing the liquid through the passages in the capsule and also by the brewed liquid which impacts on the surfaces of the collector at a higher energy therefore creating an emulsion with entrapment of gas. Therefore, the kinetic energy of the liquid impacting on a surface is decisive for the improvement of the foam. In the usual espresso-type methods generating a "water piston", this phenomenon does not take place since there is no sufficient speed of the liquid leaving the capsule.

BRIEF DESCRIPTION OF THE DRAWINGS

Additional features of the invention will appear in the detailed description of the figures which follows.

DETAILED DESCRIPTION OF THE INVENTION

Figure 1:
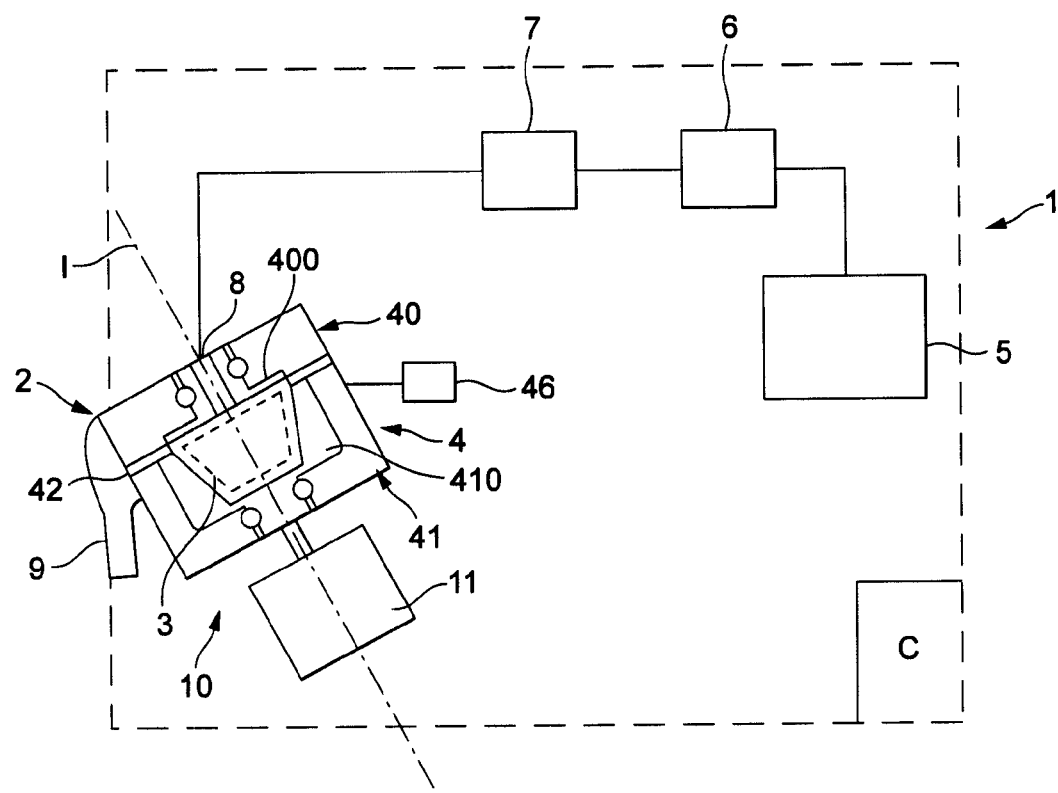
FIG. 1 is a schematic representation of system of the invention.

The system 1 of the invention is illustrated in FIG. 1 in the more general sense. The system comprises a device 2 and a capsule 3. The device has a brewing module 4 into which the capsule can be inserted for being brewed and is removed after use for being discarded (e.g., for waste or recycling). The module is in fluid communication with a water reservoir 5 containing fresh or, alternatively heated water. A fluid transport means such as a low pressure pump 6 can be provided in the water circuit to transport water from the reservoir to the module. A water heater 7 is further provided to heat water to the desired temperature. It can be noted that water could be heated in the reservoir itself and water could be transported from the reservoir by effect of vaporisation. Water can be fed into the module 4 at low or substantially no pressure. For example, a pressure between 0 and 2 bars above atmospheric pressure can be envisaged at the inlet 8 of the module.

The brewing module 4 can comprise referencing means 40, 41 for retaining the capsule in a predetermined position in the module. The capsule can be maintained in a slightly inclined position to promote the exit flow of the brewed liquid to a brewed liquid outlet 9. For instance, an angle of inclination relative to vertical can be between 2 and 65 degrees. The referencing means can comprise a capsule holder 410 and an injection lid 400. Both holder 410 and lid 400 are mounted to rotate along an axis of rotation I. The capsule holder comprises a cavity having the shape of the capsule to be received. The lid is designed to assemble against the capsule holder in a removable manner. A liquid passage 42 can be created in the module to enable liquid to be drained and collected from the capsule to the fixed outlet 9.

Driving means 10 are provided for driving the lid 400 and capsule holder 410 together in rotation and, by way of consequence, the capsule too. For this, the driving means includes an electrical motor 11 having a shaft connected to the capsule holder to force the capsule holder 41 in rotation. Since the lid 40 is attached to the capsule holder 41, the lid is also driven in rotation at the same speed as the capsule holder.

The surfaces of the collecting means of the device can be regulated in temperature so that the brewed liquid exiting the capsule is maintained at a proper temperature and does not cool down before reaching the cup. For this the lid assembly 40 and/or capsule holder assembly 41 can be associated to heating elements 46 for maintaining the capsule holder at a heated regulated temperature, such as with heating wires or thick films and the like.

Figure 2:
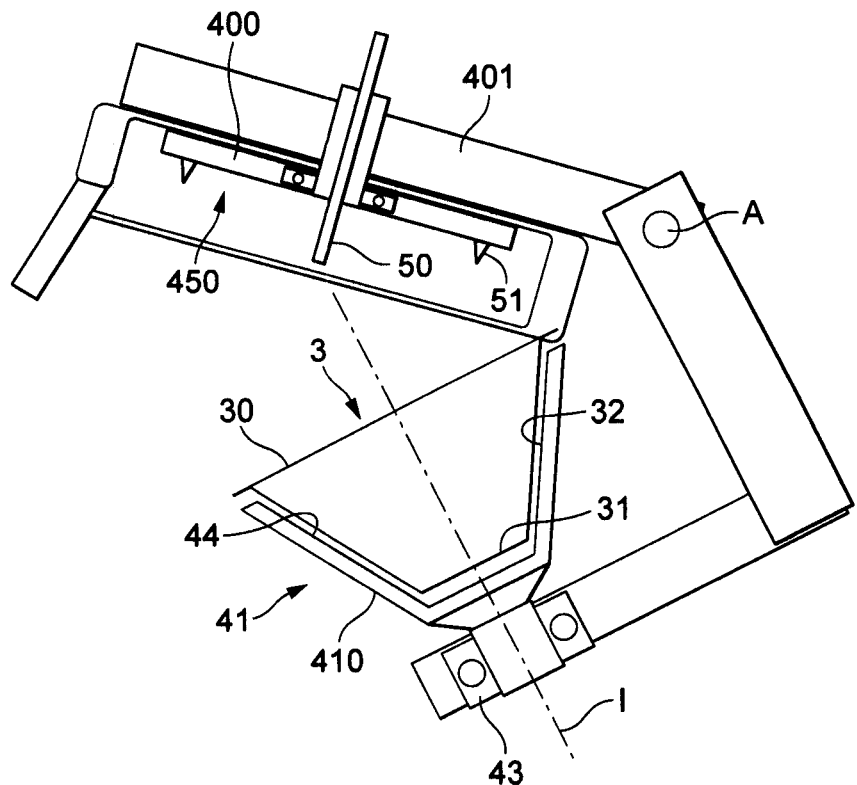
FIG. 2 is a schematic representation of a brewing module in open position of the system of the invention into which is inserted a capsule.
Figure 3:
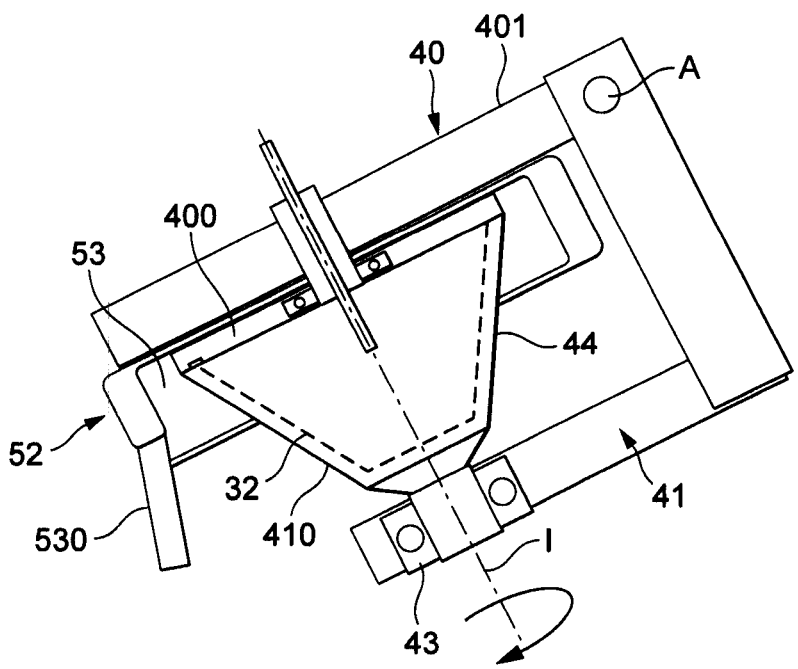
FIG. 3 is a schematic representation of a brewing module in closed position of the system of the invention which encloses a capsule.

FIGS. 2 and 3 show a detailed view of the principle of centrifugation of the capsule. The device comprises a capsule holder assembly 41 with a holder 410 having a truncomical housing 44 in which the capsule 3 is inserted. The holder is mounted along an axis of rotation I by a bearing 43. The injection lid assembly 40 is provided with an internal lid 400 which can be mounted on a fixed support part 401 of the lid assembly 40 in a pivotable manner along the axis I when the device is closed (FIG. 3).

The lid assembly and capsule holder assembly are associated along a transversal axis A between an open position as illustrated in FIG. 2 and a closed position of FIG. 3.

At the inside surface of the injection lid 40 is placed a piercing structure 450 which has the function of piercing the injection side 30 of the capsule. A water injector or lance 50 is provided which traverses the injection side 30 and which comprises an injection conduit for carrying water from the water circuit into the capsule. The water injector 50 is preferably located in the centre of the capsule. Water can thus be injected in the capsule at a location placed between the capsule lid 30 and the capsule bottom 31. The outlet of the water injector is placed closer to the bottom 31 than to the lid so that water can first wet the substance in the bottom area of the capsule. The lid further comprises outlet piercing elements 51 which are placed on the inside of the lid at a peripheral position. Preferably, a series of piercing elements 51 are placed uniformly along the periphery of the lid. Further the capsule comprises an inclined sidewall 32 which widens from the bottom 31 to the top 30 in direction of the peripheral openings or outlets pierced by the piercing elements 51. The lid is further provided with a collecting assembly 52 comprising an inside chamber 53 surrounding the capsule's peripheral openings and a nozzle 530 forming a tube for directing the beverage of liquid food to the recipient or cup. It can be noted that there is no need for a hermetical arrangement between the upper and lower parts 40, 41 of the device. Since water is pushed by the effect of gravity, water flows radially and uniformly to the sidewall 32 of the capsule to traverse the substance toward the periphery of the capsule and upwards to the peripheral opening along the sidewall 32. The brewed liquid so impacts the outward surface of the collecting assembly 52 and is so collected and pushed still by effect of gravity to the collecting nozzle 530. The advantage of the system is that there is a low axial pressure therefore there is less need for high mechanical closure forces. The technology is relatively simple since a motor working at low current is sufficient to provide the necessary momentum to carry out the brewing process. Furthermore, several types of heaters can be used such as thermos or gas.

Figure 4:
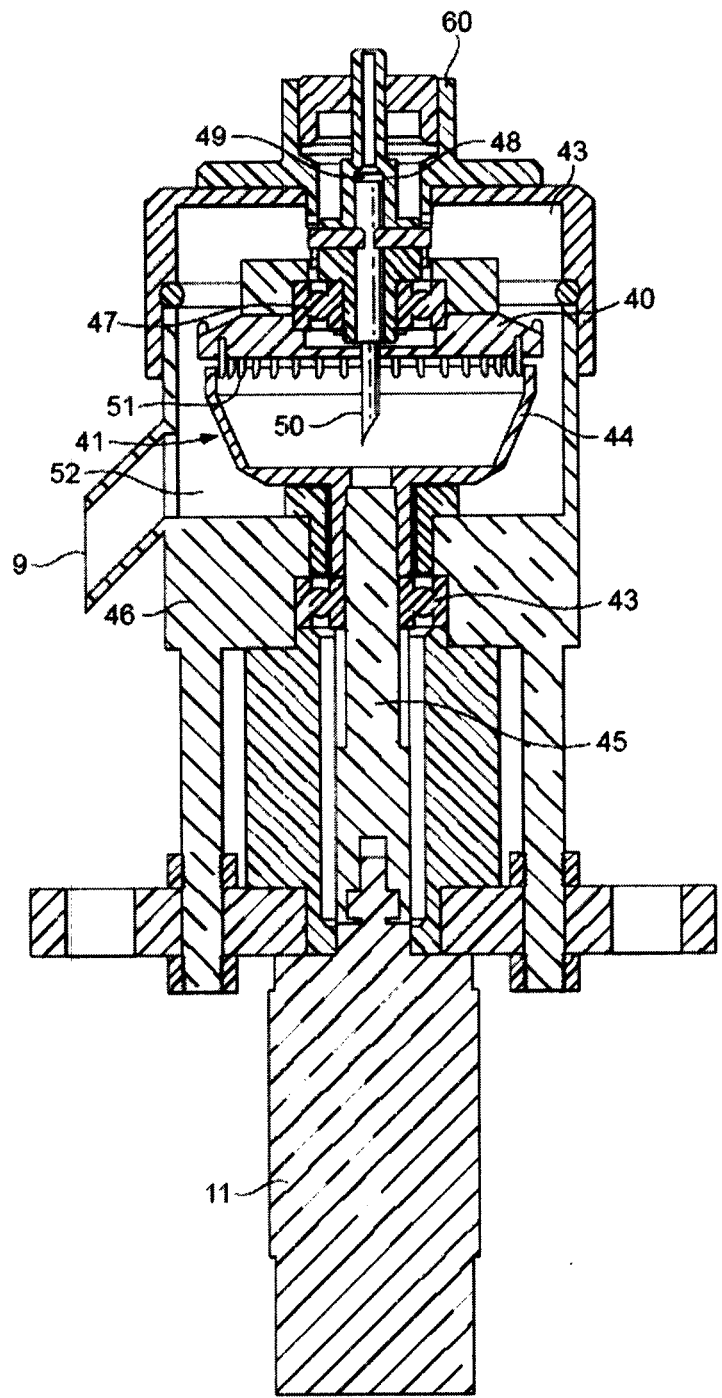
FIG. 4 is a detailed cross sectional view of the system of the invention in a first embodiment.

FIG. 4 shows a more sophisticated system of the invention. The system comprises a capsule holder 41 which is associated to a central rotating rod 45 mounted along a lower bearing 43, which is supported on a support 46. On the lower end of the rod 45 is associated an electric rotary motor 11. At the opposite side, a lid 40 is associated to an upper bearing 47, along a hollow rotating rod 48 for the entry of water in the capsule through a conduit 49 traversing the rotating rod 48. The rotating rod 45 is mounted on an upper frame 60 of the system. A series of needles 51 is also positioned on the side of the lid 40 to form small perforations at the periphery of the upper side of the capsule. The number of needles can be set between 5 and 50, preferably between 10 and 30. The higher the number of needles, the more uniform the distribution of liquid can be. When the needles 51 are engaged in the capsule, the lid is driven in rotation by the capsule itself which is also driven by the rotor 45.

The rotational speed can be set between about 5000 and 20000 rpm. For this a control unit C (FIG. 1) is provided in the device for adjusting the rotational speed as a function of the beverage to be brewed. The higher the rotational speed, the more centrifugal pressure is exerted in the capsule by the liquid and the more the substance is compacted on the sidewall of the capsule. Also, the higher the speed, the lower the residence time of the liquid in the capsule.

For example, for tea, the rotational speed can be minimal to enable a slow transfer of water through the mass of tea leaves and to provide an infusion of the tea.

For ground coffee, the speed should be high, i.e., higher than 5000 rpm, preferably within a range of about 8000-16000 rpm, in order to perform optimal extraction conditions in term of coffee solid contents in the cup and quality of the crema. It has been surprisingly found that crema obtained is much creamier than by using the standard espresso brewing methods.

Therefore, depending on the types of beverage to be brewed, the control unit can be programmed to adjust the optimal centrifugal conditions. For instance, the control unit may be associated to a capsule recognition system enabling to recognize the types of capsules, i.e., espresso, lungo, cappuccino, latte, tea, etc, and to adjust the speed and/or other brewing parameters (e.g., water temperature) according the capsule which is inserted in the device.

The brewed liquid is collected in a collecting chamber 52 of the support 46 and drained through a collecting tube 9.

Figure 5:
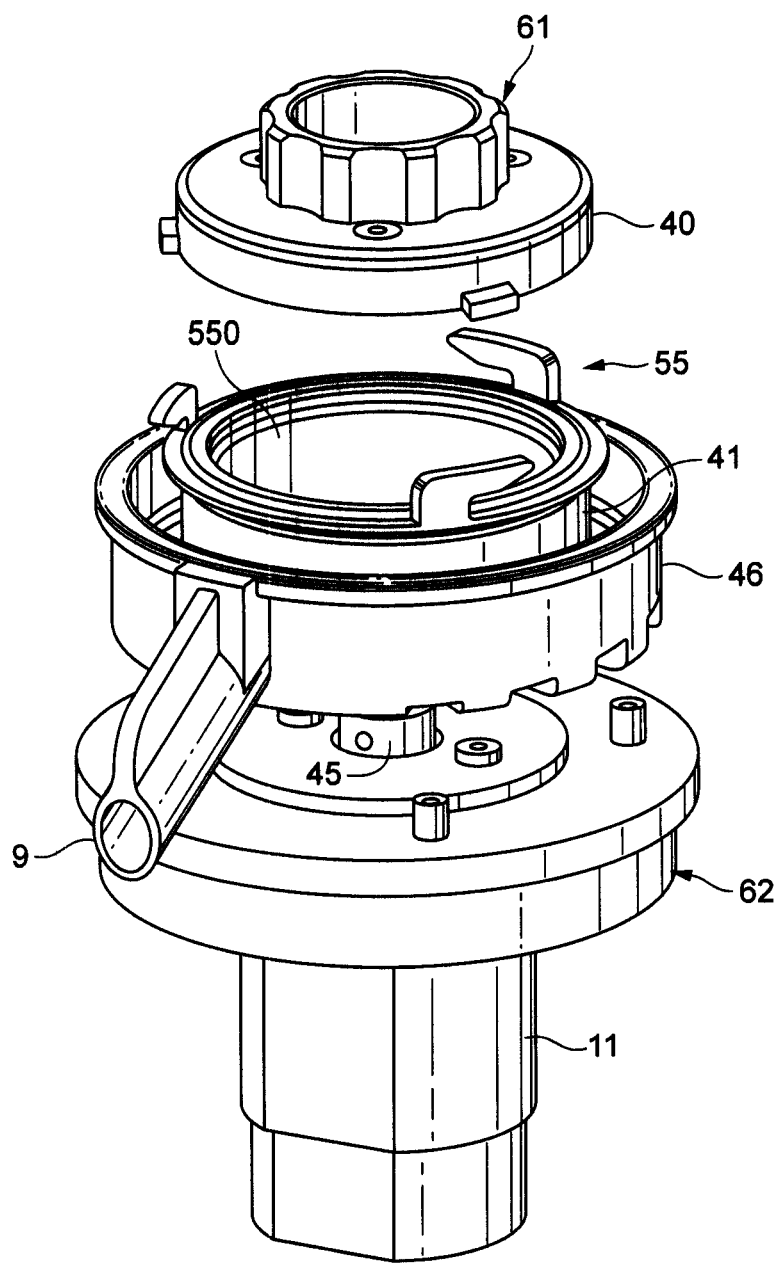
FIG. 5 is an exploded view of another embodiment of the device of the invention.

FIG. 5 illustrates another embodiment in which the injection lid 40 is connected to the capsule holder 41 by a bayonet type connection 55 or any equivalent connection means. In this embodiment, only one lower bearing (not shown) is necessary. The capsule holder 41 and the lid 40 are thus connected together and both turn along a lower rotational axle 45. The capsule holder comprises a cavity 550 for receiving the capsule. The injection lid is then connected to the capsule holder along an helicoidal tightening momentum by the bayonet means 55. For example, the bayonet means can comprise a series of radially extending protrusions on the lid which fits into a series of hooks carried on the edge of the capsule holder. Tightening may be performed by a gripping portion 61 placed on the upper side of the lid. However, the assembly must let liquid pass between the lid and the holder. A sealing joint between the lid and holder is therefore not desirable. A predefined clearance may also be ensured for controlling the exit flow of the brewed liquid by foreseeing slots or grooves of predetermined dimensions at the interface between the lid and holder.

A collecting assembly 46 having the shape of a cup larger than the capsule holder is also placed about the brewing enclosure 40, 41 for collecting the brewed liquid. The collecting assembly takes support on a base 62 of the device onto which is connected the motor 11. A liquid duct 9 is provided on a side of the cup which is slightly inclined downwards for the liquid to flow in the direction of a receptacle (e.g., a beverage cup).

Figure 6:
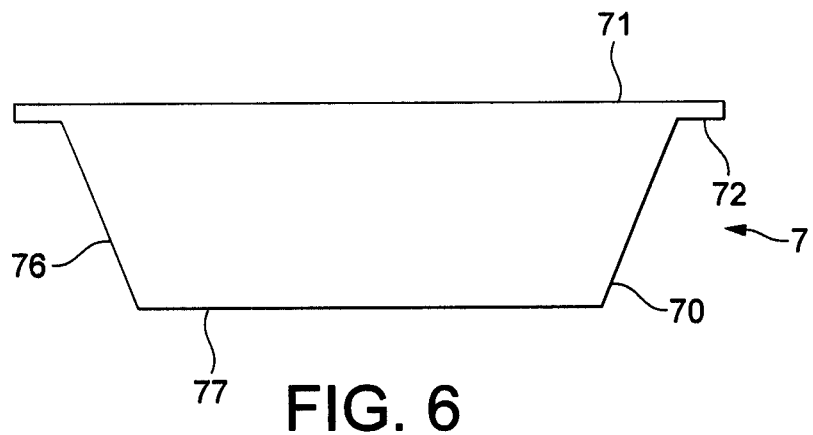
FIG. 6 shows a sealed capsule which can be used in the device of the invention according to FIG. 4 or 5.
Figure 7:
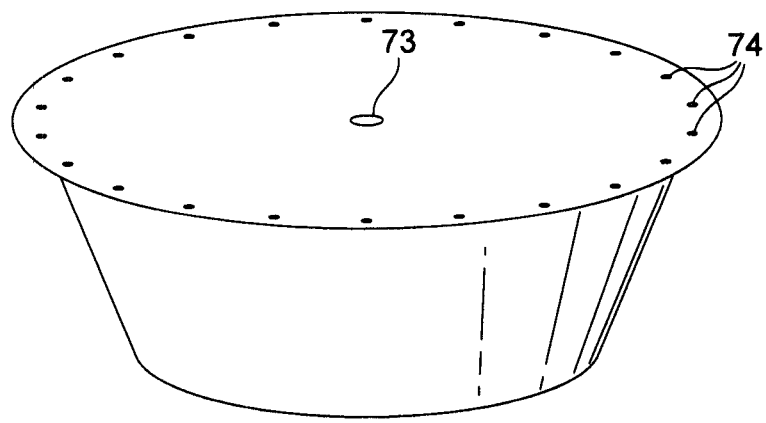
FIG. 7 shows a capsule after its use in the system of the invention.

FIGS. 6 and 7 illustrate a capsule that can suit the device according to the different embodiments of FIGS. 2 to 5. In FIG. 6, the capsule 7 comprises a cup-shaped body 70 with upwardly oriented sidewall 76 and a bottom wall 77. The sidewall forms a portion of cone which promotes the collection of the brewed liquid internally. The body terminates by an upper edge 72 raising outwards onto which is sealed a lid 71. The lid may be a flexible pierceable membrane of several microns in aluminium and/or plastic. The lid can be welded on the upper edges 72 of the body. It can be pointed out that the membrane and body preferably comprise gas barrier layers such as aluminium and/or EVOH.

The capsule contains a substance chosen among the list consisting of ground coffee, soluble coffee, tea, a whitener such as dairy or non-dairy ingredient(s), herbal tea, nutritional substance, culinary ingredients and a mixture thereof.

FIG. 7 illustrates the capsule after brewing of the substance in the device. A central water inlet 73 is pierced through the lid for passage of the water injector 50. On the side of the lid are pierced outlets 74 communicating with the inside cavity for the brewed liquid to exit the capsule.

Figure 8:
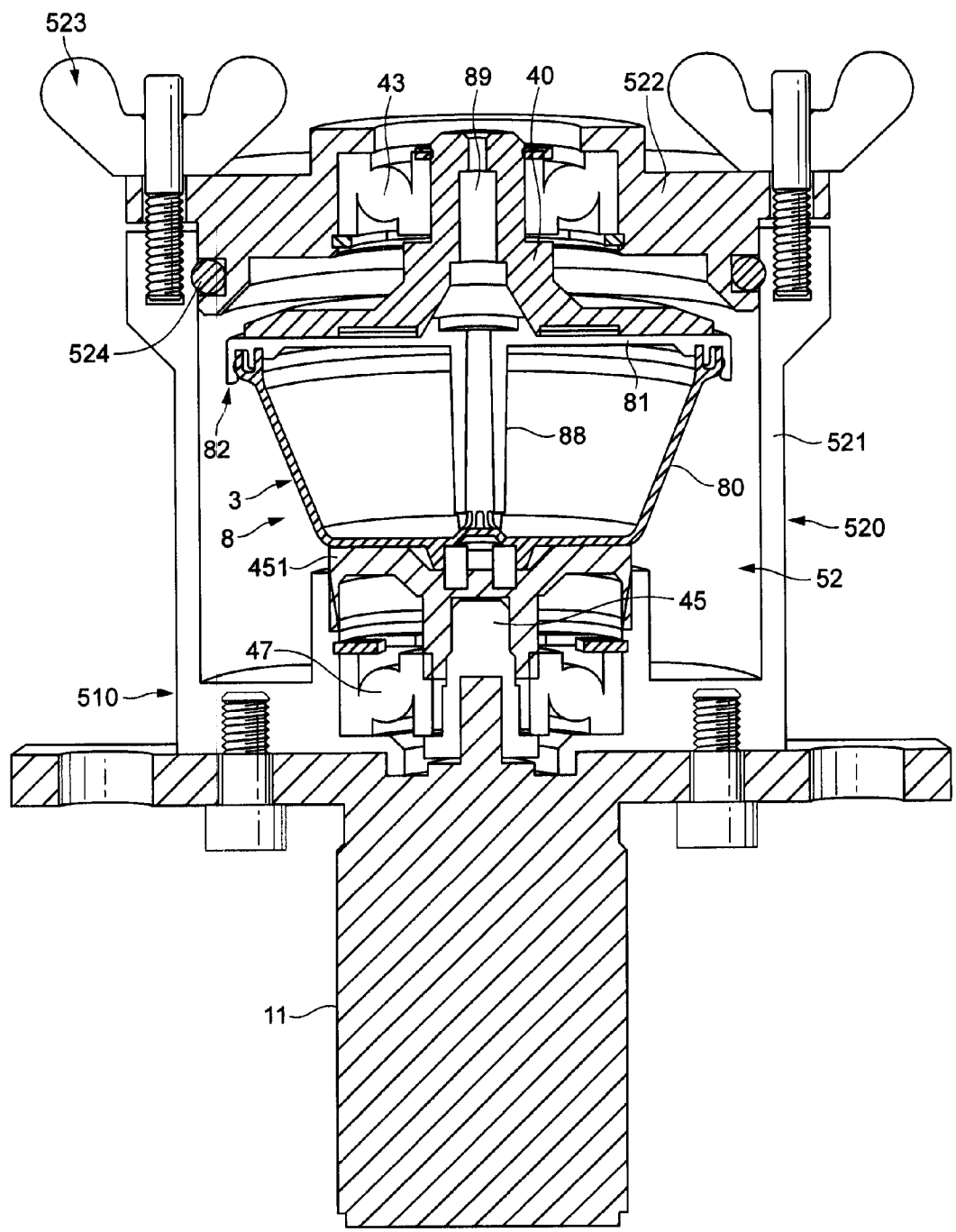
FIG. 8 is a detailed cross sectional view of the system of the invention in a second embodiment.
Figure 9:
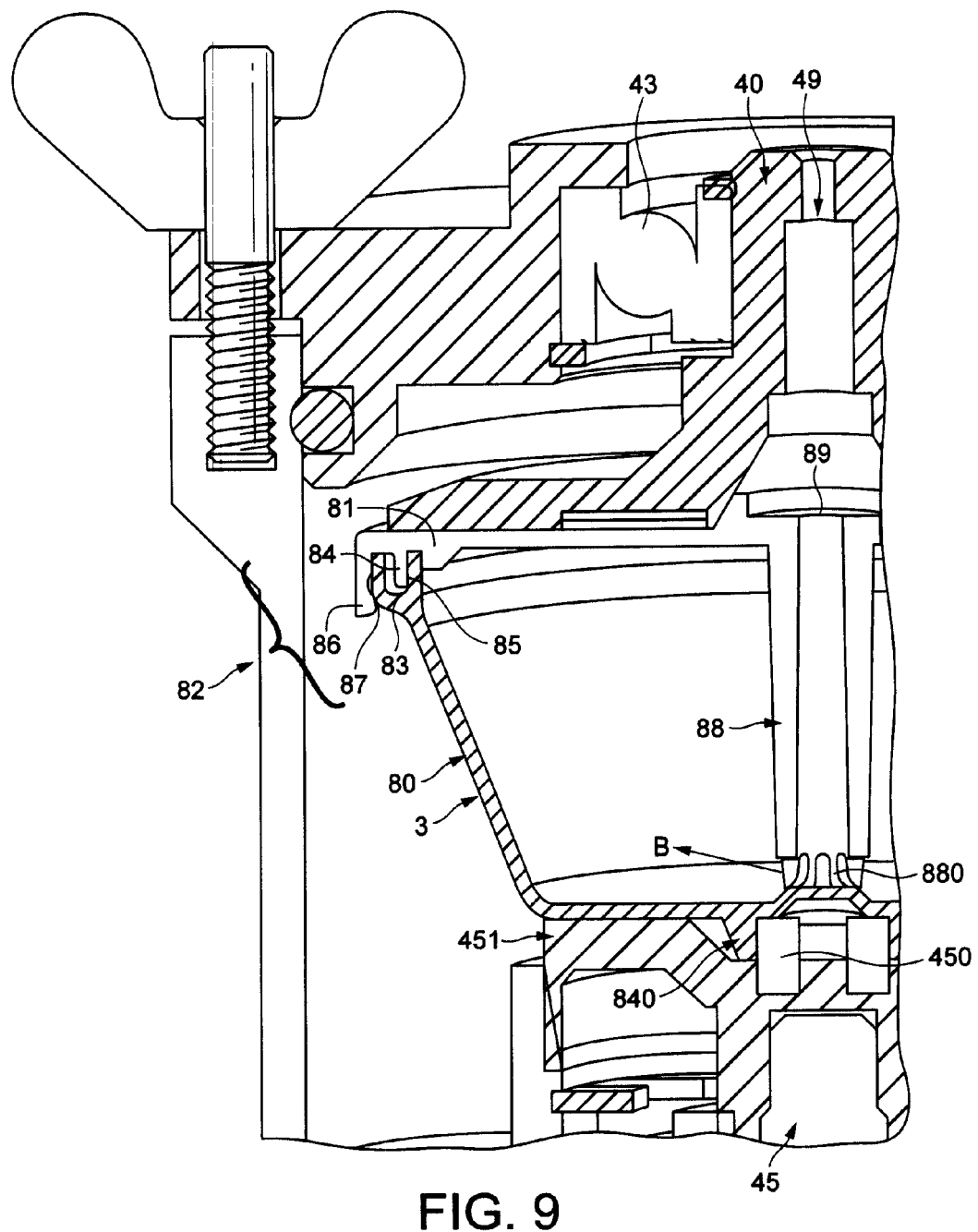
FIG. 9 shows a detail of the system of FIG. 8.
Figure 10:
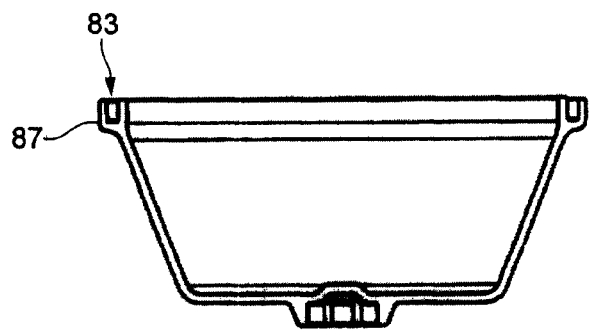
FIG. 10 shows a cross sectional view of the cup-shaped body of the capsule in the system of FIGS. 8 and 9.
Figure 11:
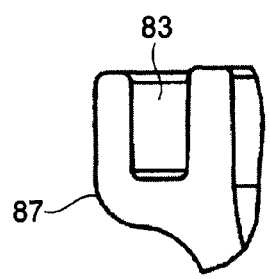
FIG. 11 shows a detail view of the clipping edge of the cup-shaped body.
Figure 14:
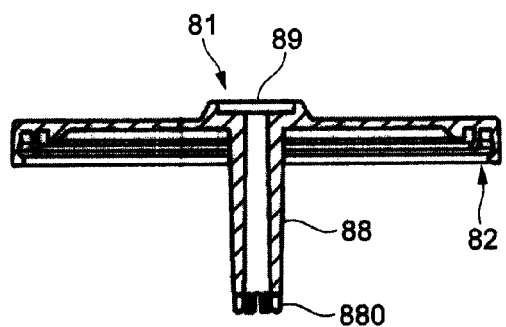
FIG. 14 shows a cross sectional view of the lid of the capsule in the system of FIGS. 8 and 9.
Figure 15:
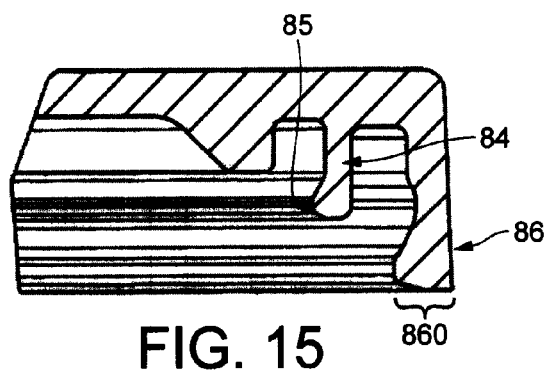
FIG. 15 shows a detailed view of the deflectable sealing means of the lid of FIG. 14.
Figure 16:
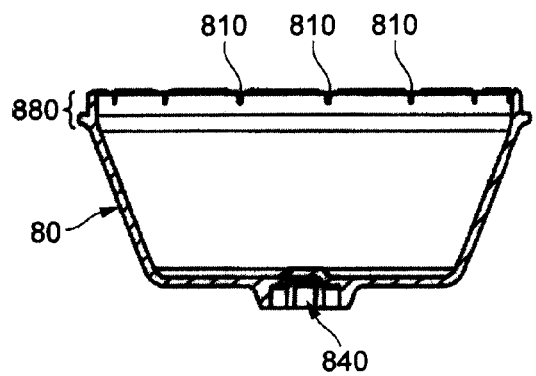
FIG. 16 shows a cross sectional view of the cup-shaped body of the capsule according to another embodiment.

Another embodiment of the present invention is illustrated in relation to FIGS. 8 and 9. In this embodiment, a capsule 8 comprising its own inflow and outflow means. More specifically, the capsule comprises a cup-shaped body 80 made of plastic onto which is secured a plastic lid 81. The lid can be tightly clipped onto the body along its edge by sealing means 82 illustrated in more details in FIGS. 9, 14 and 15. The sealing means act as a valve. More particularly, the edge of the body comprises a peripheral groove 83 formed of two small parallel and circular portions of wall rising upwardly. For this, the lid has a peripheral portion of wall forming a lip 84 that inserts itself in the groove 83. The lip 84 can end by a thicker rounded shape 85 to create a closing pressure on the surface of the groove 83 in the housing, which pressure must be overcome to let the liquid pass through the cavity or annular groove 83. The sealing lip 84 is designed in such a way that it can open a radial passage in the groove for the brewed liquid under the effect of liquid opening them when the liquid is centrifuged.

At the periphery of the lid is provided a secondary closure lip 86 that fits on the outer edge 87 of the body. This second lip 86 is designed to provide locking of the lid on the body of the capsule. For this, the lip 86 comprises an enlarged section 860 which presses on the outer surface 87 of the edge of the body.

The secondary lip 86 creates a clipping function for connection of the lid onto the body and eventually it also forms a second hurdle to be overcome for the brewed liquid to pass. This tortuous path as formed by the series of lips 84, 86 and the groove 83 generates high shear forces on the brewed liquid. The secondary lip can also be traversed by radial slits for promoting the flow of the brewed liquid (not shown). For coffee, this may result in generating a thicker and more stable crema. It can be noted that this lip could be omitted in the context of a simpler structure of the capsule.

In the centre of the capsule's lid is provided a water flow distribution member formed of a tubular portion 88 extending from the lid. This tubular portion 88 has a water inlet 89 which can be fitted to the water injection conduit 49 of the injection lid 40 of the system. The tubular portion 88 ends by flow distributing means 880 formed of several slots directed outwards in the cavity of the capsule. Several slots are distributed at the free end of the tubular portion 88. The tubular support may abut against the bottom surface of the body for demarcating the slots and for directing water in many radial directions. For instance, the number of slots may be comprised between 2 and 10. Therefore, water coming from the top will traverse the tube 88 and will exit the tube at the slots in the radial direction of the arrow B identified on FIG. 9. It can be noticed that water is so injected preferably close to the bottom of the capsule; therefore ensuring a proper wetting of the substance, e.g., coffee powder, and in the direction from the bottom to the top (i.e., between the lid and body) where the brewed liquid leaves the capsule.

The capsule 8 of FIGS. 8 to 15 according to this embodiment can further include means 840 for gripping the bottom of the capsule and so enabling the capsule to be properly driven in rotational motion by the device. For this, the means 840 comprises a small tubular portion protruding in the bottom of the capsule and into which can be inserted a complementary tubular portion 450 of the rotational driving means of the device.

Figure 12:
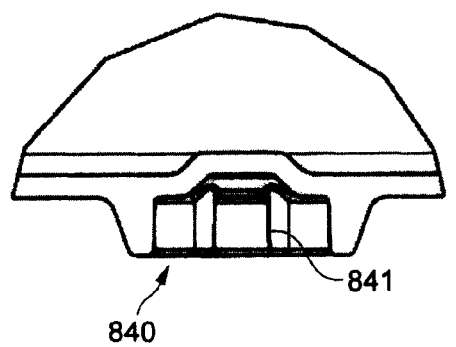
FIG. 12 shows a cross sectional view of a detail, i.e., of the engaging connection, of the cup-shaped body of FIG. 10.
Figure 13:
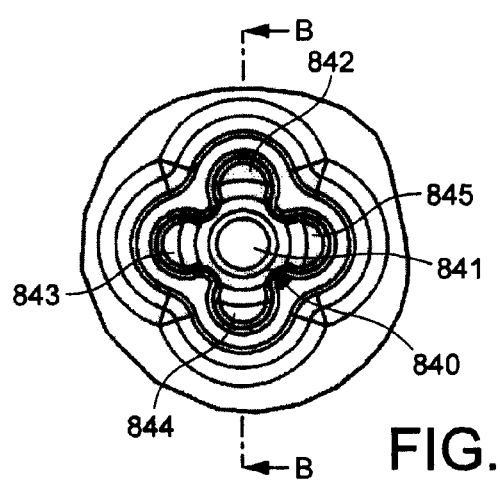
FIG. 13 shows a plane view of the detail of FIG. 12.

The driving means of the device further comprise a drive shaft 45 associated to a support 451 for holding the bottom of the capsule. Of course, the shape of the gripping means can take many other variations without departing from the scope of the present invention. FIGS. 12 and 13 show a gripping structure 840 having a central recess 841 and four arched recesses 842, 843, 844, 845 extending from the central recess 841. This gripping structure forms a lock into which is fitted a complementary engaging structure 450, i.e., a key, of the capsule holder 451. The complementary shapes of the capsule and capsule holder enable to fulfil both the gearing function for driving the capsule at high speeds in rotation and a safety function for ensuring that only capsules adapted to the system can be used and brewed successfully.

In this embodiment for FIGS. 8 and 9, the device itself comprises, as in the preceding modes, upper and lower bearings 43, 47 for enabling the injection lid and support of capsule 451 to rotate in conjunction with the capsule 3. Surrounding the capsule is a collecting assembly 52 with a cup 520 formed of a side and bottom walls 521 and an upper closing cover 522. The cover also serves for receiving the upper bearing 43 while the lower cup 520 has a central recess for receiving the lower bearing 47. The cup 520 and the cover 522 can be assembled in fluid tight manner to avoid uncontrolled projection of brewed liquid. Therefore connection means 523 can be provided and a fluid tight sealing element, such as an O-ring 524, can also serve to ensure tightness between the two parts. Also a beverage outlet tube (not shown) can be provided to drain the beverage outside of the collecting assembly.

As also apparent in FIG. 8, the driving means of the device comprise a lower electrical motor 11 which is coupled to a driving shaft or drive connector 45 which is itself connected to the capsule holder 451. Note that the capsule holder may be a simple plate support or disc 451 or a support shaped as a cup, for example, if the capsule has no sufficiently rigid sidewalls.

The brewing operation of the system of FIGS. 8 and 9 can be shortly explained as follows:

A capsule 3 as described contains a dose of substance is provided. The capsule can be filled with roast and ground coffee. The capsule is inserted in the cup 520 when the cover is removed and placed on the capsule holder 451 with the engaging structure of the engaging structure 450 fitting the recess portion 840 of bottom of the capsule. By the approach and connection of the cover 522 to the cup 520, The injection lid 40 is then connected or associated to the capsule's lid 81 with the water conduit 89 coming in communication with the water injection tube 88 of the capsule. When the device is in the closed position of FIG. 8, water can be injected at low pressure or just poured into the conduit through the tubular portion 88. Preferably, some water is poured to start wetting the substance in the capsule before the capsule is driven in rotation by the rotational driving means of the device. Then, the control unit starts the motor and the capsule is so driven in rotation at high speed to perform the centrifugal brewing operation. Under the effect of centrifugal forces, the powder substance tends to compact itself radially whereas water is forced to flow through the substance. This results in the substance being both compacted and intimately wetted by water. Due to high speed rotational movement, the centrifugal forces exert themselves uniformly on the mass of substance. Consequently, the water distribution is also more uniform compared to usual methods using a pressure pump to exert pressure on and through the bed of substance. As a result, there is less risk of preferential flow path through the substance which could lead to areas which are not properly wetted and so not properly extracted. With ground coffee powder, the liquid that reaches the internal sidewall of the capsule is so a liquid coffee extract. This liquid extract is then forced to flow upwards along the side of the capsule up to the sealing means 82. The sealing means 82 are thus submitted to an opening force by the liquid under the centrifuge effect. This results in the lip that tends to bend outwardly to create a passage between the surface 85 and the inner surface of the groove. Similarly, the second lip is also forced to bend or alternatively may allow a certain leakage, for example, with premade slits for letting the liquid escape the capsule. The liquid can thus flow through the small peripheral groove 83 and can exit out of the capsule. The brewed liquid can be so collected by the collector 52 and be guided outside of the device into the recipient.

Figure 17:
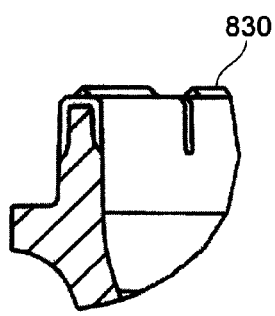
FIG. 17 shows a cross sectional view of a detail of the body of FIG. 16.
Figure 18:
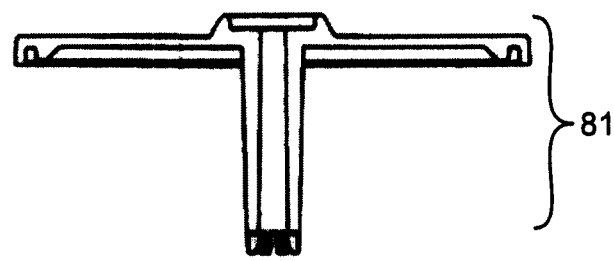
FIG. 18 shows a cross sectional view of the lid of the capsule that connects to the capsule's body of the embodiment of FIGS. 16 and 17.
Figure 19:
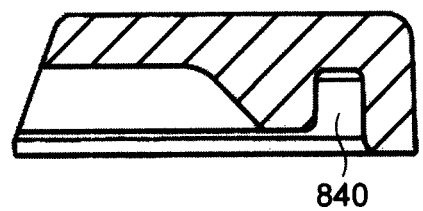
FIG. 19 shows a detail of the lid of FIG. 18.

FIGS. 16 to 19 illustrate another embodiment of the capsule according to the invention. This capsule has a cup-shaped body 80 comprising the same gripping means 840 at its outer surface for enabling the capsule to be driven in rotation in the device. The capsule also comprises a lid 81 shown in FIGS. 18 and 19. Contrary to the capsule of the preceding mode, the lid 80 and body 81 are attached by permanent connecting means such as ultrasonic welding. The brewed liquid that is centrifuged is allowed to pass through a series of slits 810 provided on the upwardly protruding edge 880 of the body. The slits are sized so to act as a filter for retaining the solid particles such as the ground coffee particles but let the liquid leave the capsule. The lid is connected with the edge 880 fitting into a radial groove 840 of the lid 81 (FIG. 19). FIG. 17 also shows small indents 830 serving as energy directors that can melt during the ultrasonic welding. In the present mode, the capsule does not comprise a deflecting sealing lip but it simply has slits 810 for enabling the brewed liquid to traverse the capsule. The capsule of this mode can be used in a device as illustrated in FIGS. 8 and 9.

Figure 20:
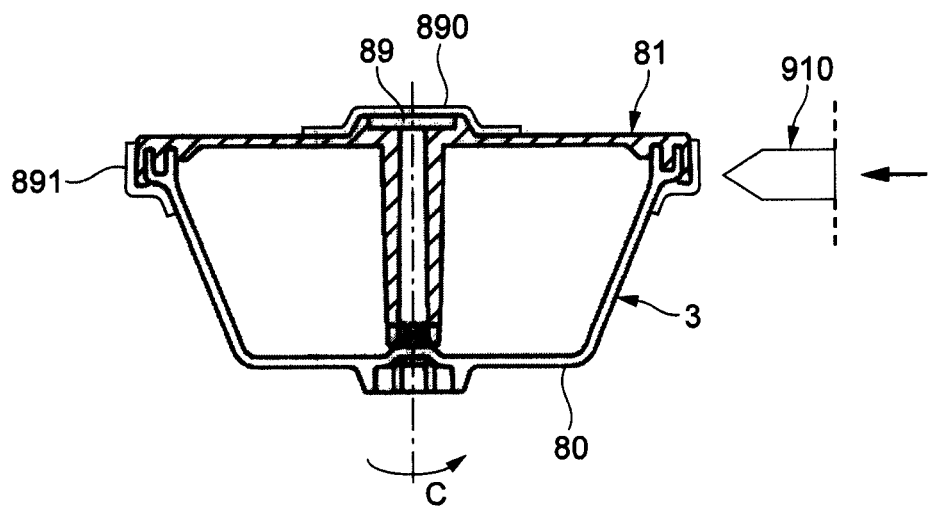
FIG. 20 shows a sealed capsule and an operational mode for removing the seal of the capsule.

In FIG. 20, a sealed capsule of the invention is shown. The capsule is formed, as described in the preceding modes, of a cup-shaped body 80 onto which is assembled a lid 81. The water inlet 89 of the lid is covered by a sealing membrane 890. The radial outlet area placed between the lid and body is also covered by a sealing membrane 891. Note that the same sealing membrane could cover both the water inlet 89 and the outlet area for the brewed liquid. The sealing membrane 891 can be a tamper evidence element such as a ribbon of an adhesive membrane sealed along the line between the lid and body. The ribbon can be cut by a cutting tool 910 in the machine, such as a blade or an equivalent means. As the capsule is driven in rotation (as shown by arrow C), the cutting tool is approached in contact with the ribbon which is thus automatically cut. The capsule is so no longer impervious and liquid can escape the capsule through the radial edge of the capsule as previously explained. One can note that the sealing membrane(s) can also be made of a peelable adhesive material so that the user himself can remove it (them).

Figure 21:
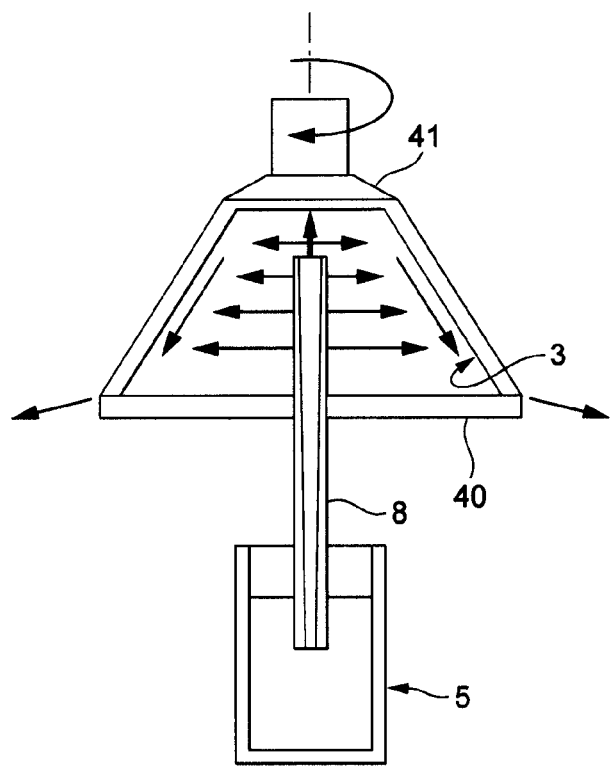
FIG. 21 shows a schematic view of the system of the invention according to another possible embodiment.

According to FIG. 21, the system may also foresee an injection of water by aspiration under the effect of the rotational momentum. For this, a capsule is housed in the referencing means 40, 41. An injection tube 8 connects a water reservoir to the inside of the capsule. The device is so oriented that the reservoir is below the capsule and water is transported by the vacuum that is produced in the centre of the capsule. The injection tube also engages into the capsule up to a region preferably closer to the more narrow side or bottom so that water can wet the whole mass of substance, e.g., ground coffee powder.

Figure 22:
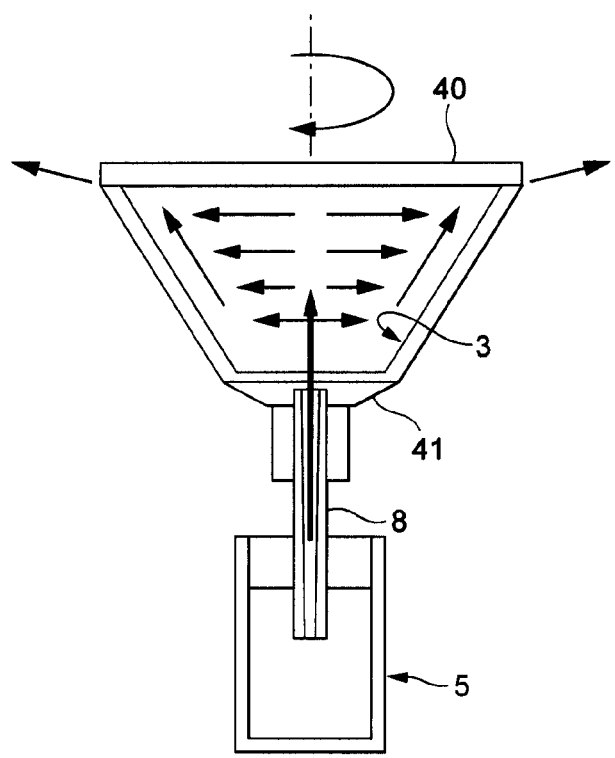
FIG. 22 shows a schematic view of the system according to still another embodiment.

One can note that the capsule can be positioned with its sidewall widening downwardly. In FIG. 22, the system is similar but the orientation of the capsule is simply inverted and it widens upwardly.

In the two embodiments of FIGS. 21 and 22, water is preferably injected near the more narrow side of the capsule, i.e., opposite the widening side, in order for the liquid to flow through the substance in the direction of the wider side of the capsule and to then exit the capsule.

Figure 23:
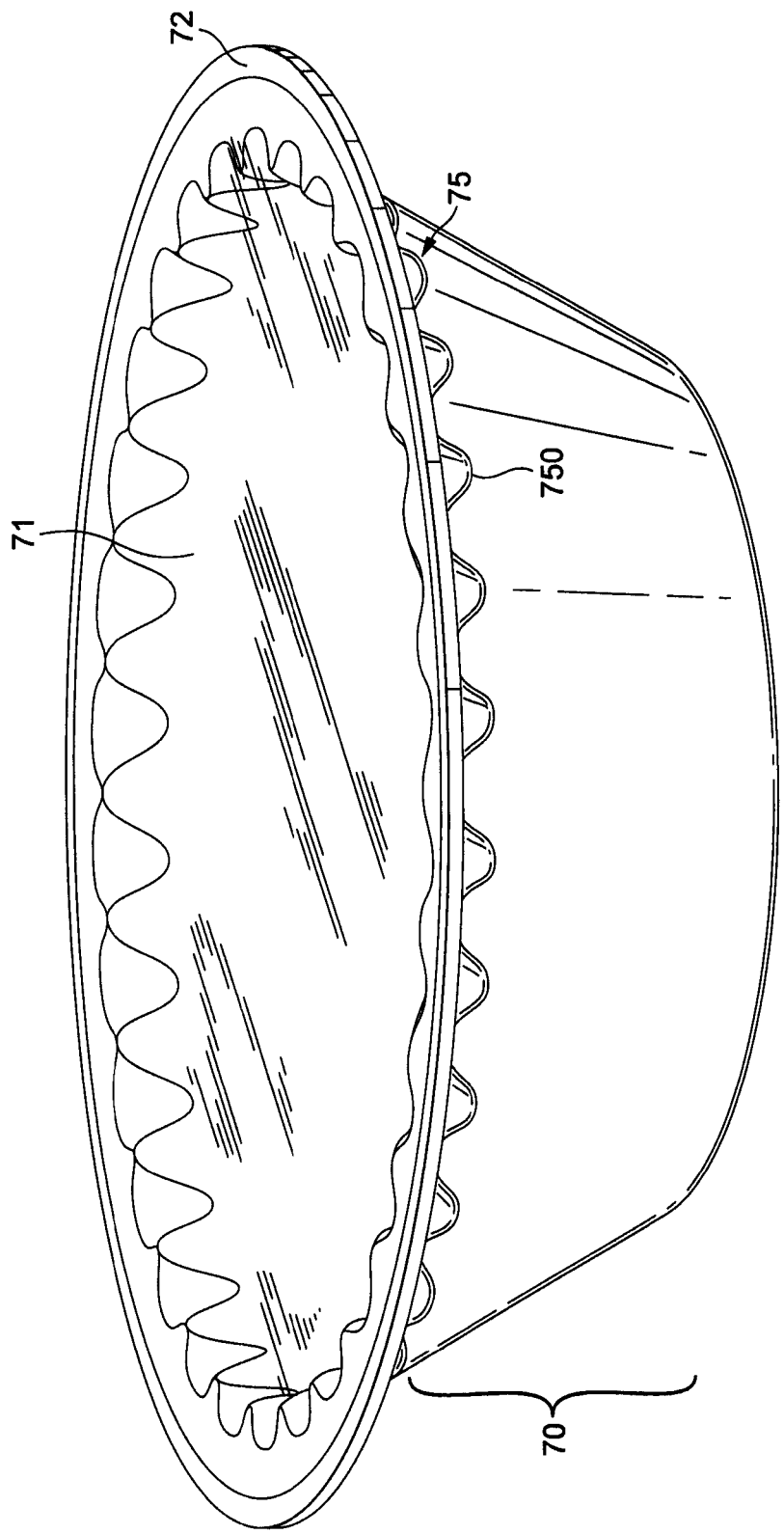
FIG. 23 shows a schematic view of the system according to still another embodiment.

FIG. 23 illustrates another capsule of the invention. The capsule comprises means for connecting it to the external rotational driving means of the device. For this, capsule has a toothed structure 75 on at least one of its outer surface. The capsule has a body 70 comprising an upper edge 72 which can be closed by an upper membrane 71. The toothed structure comprises a series of teeth which is positioned below the edge or rim 72 of the body of the capsule. The teeth are placed along the whole periphery of the body of the capsule. The body of the capsule can be made of plastic and/or aluminium or aluminium alloy. For example, it can be moulded by injection of plastic or deep drawn in aluminium. For example, the shape of the teeth could be slightly triangular, oval, rectangular or pyramidal. It should be noticed that the teeth could be replaced by other equivalent structures such as series of elements in relief and/or hollow. For example, slits, pins or small needles can be envisaged.

Figure 24:
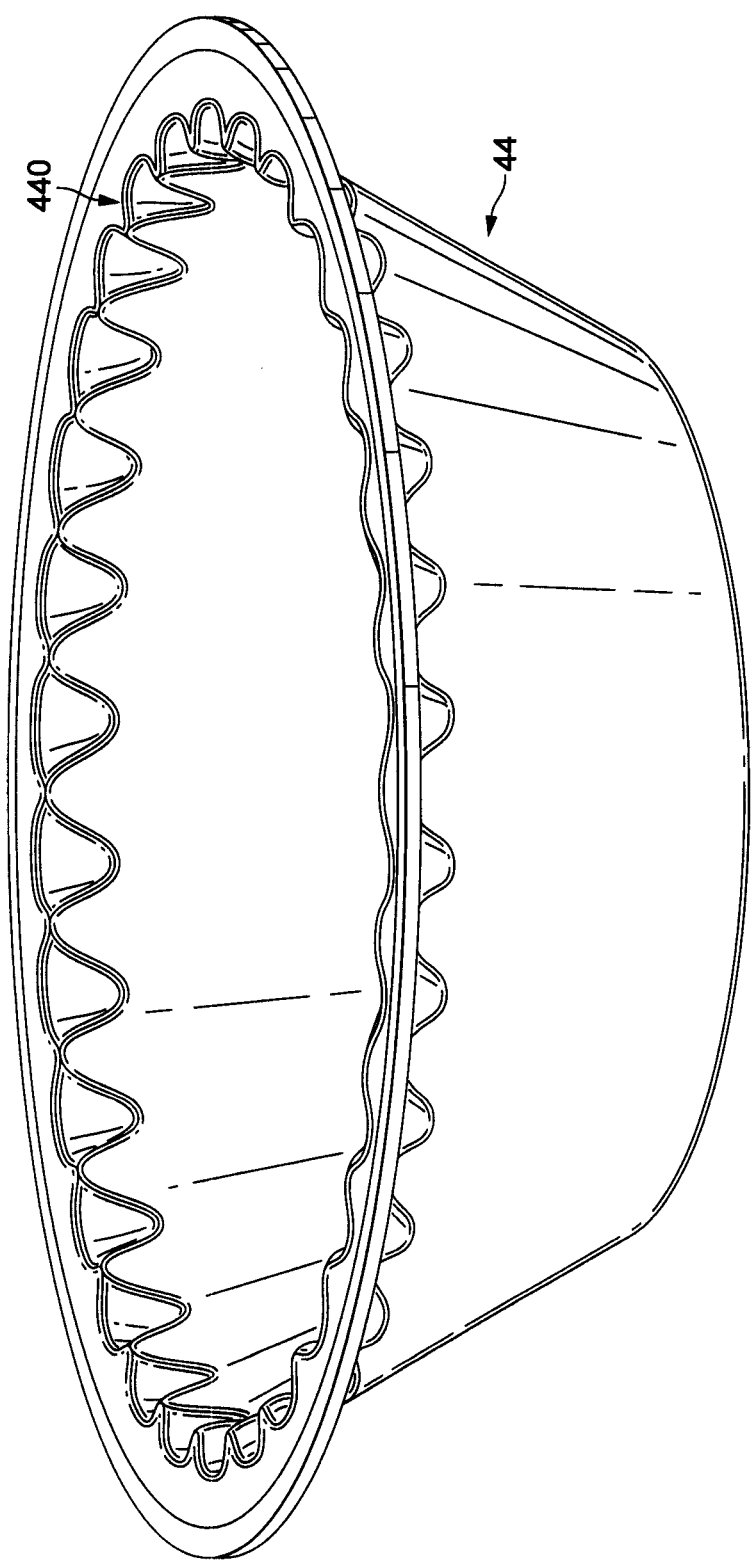
FIG. 24 shows a view of a capsule according to another mode of the invention.

The device itself that receives the capsule of FIG. 23 comprises a toothed surface of complementary shape. FIG. 24 shows a capsule holder 44 adapted to receive the capsule of FIG. 23. The capsule holder has a cavity into which are provided hollow teeth 440. The hollow teeth are arranged to fit the teeth 750 on the outer surface of the capsule.

It should be noted that the connecting or engaging structure of FIG. 23 can replace the structure of the capsule of FIGS. 8 and 9 or reciprocally.

Figure 25:
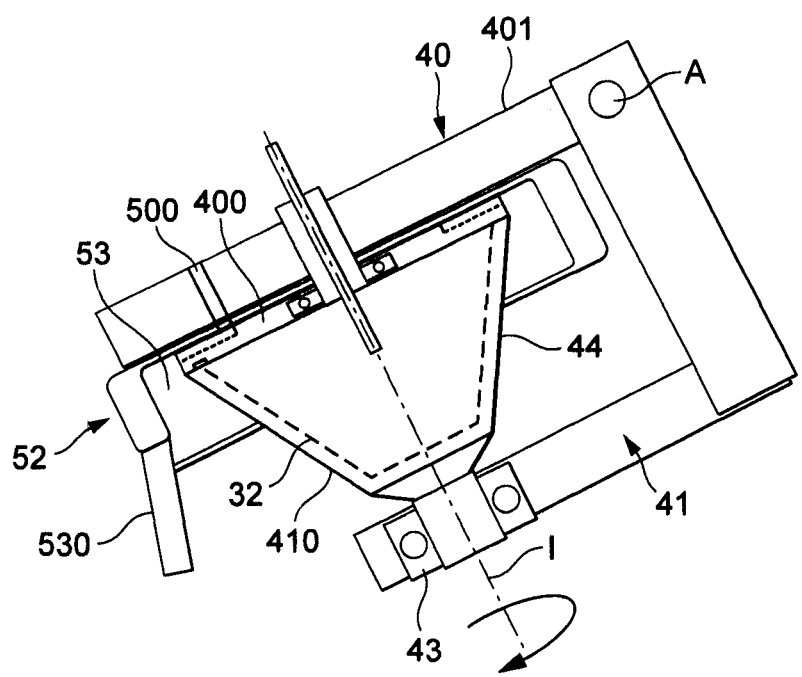
FIG. 25 shows a schematic representation of a brewing module in closed position of the system of the invention according to yet another embodiment of the invention.

In FIG. 25, is illustrated another embodiment of the brewing system of the invention. The difference is here that a water by-pass conduit 500 is provided in addition to the main water conduit 50 for adding a volume of water in the collecting assembly 52. A volume of water may be added before, during or after the centrifugal brewing operation in the capsule. The by-pass conduit ends on the upper surface of the rotating lid 400. The upper surface of the lid 400 may comprise a water distribution structure such as radial grooves or recesses to promote the flow of water toward the surface of the collecting assembly. The control unit may control the delivery of the added volume of water so that the volume is added at the same time as the coffee extract is delivered by centrifugation so that the foam that is created on the top of the beverage is not destroyed.

The system and method of the invention provide remarkable brewing results with solid contents which are higher than usual methods and devices. The results are very reproducible from capsule to capsule. Surprisingly, crema is also remarkably improved with a creamier, more stable and thicker texture.

Of course, the invention may encompass many variants which are included in the scope of the patent claims that follow.

What is claimed is:

1. A method for preparing a beverage in a beverage preparation device from a predetermined does of a beverage substance contained in a filtering capsule, which method comprises:

piercing a plurality of peripheral outlets in a sealed capsule having a cup-shaped body, that has longitudinal central axis, and a sealing lid sealed onto the body, with the body of the capsule having its widest dimension at the lid, and with the peripheral outlets distributed along the periphery of the sealing lid;

piercing the sealing lid of the capsule and introducing water in the capsule through the sealing lid; and centrifugally rotating the capsule in the beverage preparation device about the longitudinal central axis of the capsule to force the water to flow through the substance in a centrifugal flow path to form the beverage, leaving the capsule through the peripheral outlets;

wherein the beverage preparation device comprises water feed means for introducing water in the capsule, means for centrifugally rotating the capsule to apply the centrifugal forces to force the water flow through the substance in a centrifugal flow path to prepare the beverage and referencing means for positioning and referencing the capsule in a removable manner in the device and in operational relationship with the water feed means and along the longitudinal central axis of rotation in the centrifugal rotating means; the referencing means being designed for receiving the capsule in a removable manner and for receiving the capsule and the referencing means comprising a water injection lid that engages against the capsule, is traversed by a water conduit and includes means for piercing at least one water inlet in the lid at the longitudinal central axis of the capsule, and with the referencing means comprising means for piercing the sealing lid of the sealed capsule to provide the peripheral outlets for enabling the beverage to leave the capsule and wherein the piercing means is formed of a series of needles on the injection lid to pierce the beverage outlets in the sealing lid.

2. The method of claim 1, wherein the capsule is centrifugally rotated at a centrifugal speed of at least 500 rpm, the water is introduced in the capsule at substantially no pressure, and the peripheral outlets are made before or when water is introduced in the capsule.

3. The method of claim 1, wherein the capsule is sealed in a gas tight manner and contains ground coffee powder, soluble coffee, tea, chocolate, whitener, flavours or combinations thereof, with the dose of the substance included therein forming one or two servings of the beverage, and with the capsule oriented at an axis of rotation that is vertical or inclined relative to vertical at an angle that is less than 90 degrees.

4. The method of claim 1, wherein the referencing means comprises a capsule holder associated with the centrifugal rotating means for allowing the capsule to be rotated around its central axis at a centrifugal speed of at least 500 rpm.

5. The method of claim 1, wherein the capsule is impermeable to gas and comprises a flexible membrane that is attached to the cup-shaped body.

6. The method of claim 1, wherein the capsule has an axis of rotation and the lid comprises a pierceable membrane, and the device comprises inlet piercing means of a single needle for piercing the membrane and for enabling the water feed means to introduce water in the capsule, with the inlet piercing means arranged to pierce at least one water inlet at the longitudinal central axis of rotation of the capsule.

7. The method of claim 1, wherein the peripheral outlets piercing means comprises a series of needles positioned in a circular pattern and arranged in relation to the capsule to pierce radial holes in the capsule.

8. The method of claim 1, wherein the centrifugal rotating means comprises a drive shaft and an electrical motor connected to the referencing means for rotating the capsule.

9. The method of claim 8, wherein the referencing means comprises a capsule holder having a cavity which is rotatable and which is connected to the motor via a drive shaft arranged for driving the capsule holder about its central longitudinal axis.

10. The method of claim 1, which further comprises a collector for collecting the beverage, the collector including a by-pass conduit arranged to add a volume of water into the collector without such water passing into the capsule.

11. The method of claim 1, which further comprises a control unit adapted to vary the speed of the centrifugal rotation means for rotating the capsule at at least two different centrifugal speeds to provide different centrifugal pressures of water in the capsule.

12. The method of claim 1, wherein the water feed means comprises a pump and an injection tube connected to a water reservoir for injection of water in the capsule under the effect of rotational momentum.

13. A method for preparing a beverage in a beverage preparation device from a predetermined dose of a beverage substance contained in a filtering capsule, which method comprises:

providing a single use sealed capsule having a bottom and sidewall forming a cup-shaped body that has a central longitudinal axis, and a sealing lid sealed onto the body, with the body of the capsule having its widest dimension at the lid, providing a plurality of peripheral outlets in and with the peripheral outlets distributed along the periphery of the sealing lid;

opening the sealing lid of the capsule by an injector that introduces water in the capsule through the sealing lid; and centrifugally rotating the capsule in the beverage preparation device about the central longitudinal axis of the capsule to force the water to flow through the beverage substance in a centrifugal flow path to form the beverage which leaves the capsule through one or more of the peripheral outlets; and wherein both the opening of the sealed lid by the water injector and the peripheral outlets in the lid are provided by simultaneously piercing the lid of the sealed single use capsule, wherein the water is injected essentially at the central longitudinal axis of the capsule so that it passes from a central area of the capsule downwardly and radially outwardly through the beverage substance due to gravitational and centrifugal forces and then upwardly along the sidewall to the outlets to form the beverage which exits the capsule through the peripheral outlets.

14. A method for preparing a beverage in a beverage preparation device from a predetermined dose of a beverage substance contained in a capsule, which method comprises:

providing a plurality of peripheral outlets in a sealed single use capsule having a central longitudinal axis, a bottom and sidewall forming a cup-shaped body and a sealing lid sealed onto the body, with the peripheral outlets are provided by piercing the lid of the sealed capsule and are distributed along the periphery of the sealing lid, and;

opening the sealing lid of the capsule by an injector that introduces water in the capsule through the sealing lid; and centrifugally rotating the capsule in the beverage preparation device about the central longitudinal axis of the capsule to force the water to flow through the substance in a centrifugal flow path to form the beverage which leaves the capsule through the peripheral outlets;

wherein the both the opening of the sealed lid by the water injector and the peripheral outlets in the lid are provided by simultaneously piercing the lid of the sealed single use capsule, with the peripheral outlets formed by a series of needles positioned in a circular pattern and arranged and advanced in relation to the capsule to pierce radial holes in the lid of the capsule; and wherein the water is injected essentially at the central longitudinal axis of the capsule prior to rotation so that it passes from a central area of the capsule downwardly due to gravitational force and then during rotation passes radially outwardly through the substance and then upwardly along the sidewall to the outlets due to centrifugal force to form the beverage which exits the capsule through the peripheral outlets.

15. A method for preparing a beverage in a beverage preparation device from a predetermined dose of a beverage substance contained in a capsule, which method comprises:

providing a sealed single use capsule having a bottom and sidewall forming a cup-shaped body that has a central longitudinal axis and a sealing lid sealed onto the body, with the body of the capsule having its widest dimension at the lid, introducing water into the beverage substance in the capsule by inserting an injector through a central portion of the sealing lid, while simultaneously providing a plurality of peripheral outlets in the sealing lid and along the periphery of the sealing lid; and centrifugally rotating the capsule in the beverage preparation device about its central longitudinal axis to form the beverage by urging the water to flow through the substance and radially outwardly in a centrifugal flow path towards the peripheral outlets with thus formed beverage exiting the capsule through the peripheral outlets.

* * * * *